(12) United States Patent
Hamel

(10) Patent No.: US 7,591,187 B2
(45) Date of Patent: Sep. 22, 2009

(54) WIRELESS VIBRATING STRAIN GAUGE FOR SMART CIVIL STRUCTURES

(75) Inventor: Michael John Hamel, Essex Junction, VT (US)

(73) Assignee: Microstrain, Inc., Williston, VT (US)

(*) Notice: Subject to any disclaimer, the term of this patent is extended or adjusted under 35 U.S.C. 154(b) by 192 days.

(21) Appl. No.: 11/431,194

(22) Filed: May 10, 2006

(65) Prior Publication Data
US 2006/0254365 A1    Nov. 16, 2006

Related U.S. Application Data

(60) Provisional application No. 60/679,351, filed on May 10, 2005.

(51) Int. Cl.
*G01L 1/00*    (2006.01)
(52) U.S. Cl. ...................................... 73/778
(58) Field of Classification Search ............... 73/778
See application file for complete search history.

(56) References Cited

U.S. PATENT DOCUMENTS

| | | | | | |
|---|---|---|---|---|---|
| 2,760,037 | A | * | 8/1956 | Statham | 73/726 |
| 3,290,930 | A | * | 12/1966 | Drinkwater | 73/862.325 |
| 3,311,842 | A | * | 3/1967 | Beck | 331/66 |
| 3,543,585 | A | * | 12/1970 | Brown | 73/704 |
| 3,786,348 | A | * | 1/1974 | Lynas et al. | 324/727 |
| 3,889,525 | A | * | 6/1975 | Bailey | 73/579 |
| 4,074,565 | A | | 2/1978 | Harris | |
| 4,277,973 | A | * | 7/1981 | Hawkes | 73/862.41 |

(Continued)

OTHER PUBLICATIONS

S.W. Arms, "Remotely Reprogrammable Sensors for Structural Health Monitoring," Sep. 16, 2004, Structural Materials Technology NDE/NDT for Highways and Bridges, Buffalo,NY.

(Continued)

*Primary Examiner*—Lisa M Caputo
*Assistant Examiner*—Octavia Davis
(74) *Attorney, Agent, or Firm*—James Marc Leas

(57) ABSTRACT

A gauge includes a wire, a housing, a coil, a processor, and a power supply. The wire is mounted in the housing to vibrate at a natural frequency. The coil is magnetically coupled to the wire. The processor is connected to provide a digital signal to the coil and the processor is further connected to detect when the wire is vibrating. An embodiment provides an efficient technique to excite the wire into vibration. Another embodiment enables long term operation from a small battery. Another embodiment enables wireless communications to be used, eliminating the need for cable runs.

87 Claims, 18 Drawing Sheets

U.S. PATENT DOCUMENTS

| | | | | |
|---|---|---|---|---|
| 4,319,189 | A * | 3/1982 | Cullum et al. | 324/207.13 |
| 4,413,892 | A * | 11/1983 | Lambeth | 396/89 |
| 4,663,975 | A * | 5/1987 | Parkinson | 73/778 |
| 4,720,676 | A * | 1/1988 | Anderson et al. | 324/207.17 |
| 4,725,762 | A * | 2/1988 | Jagschitz | 315/226 |
| 4,831,558 | A * | 5/1989 | Shoup et al. | 702/188 |
| 5,005,678 | A * | 4/1991 | Julien et al. | 188/378 |
| 5,038,622 | A * | 8/1991 | Tijmann | 73/862.393 |
| 5,123,282 | A * | 6/1992 | Ikeda et al. | 73/704 |
| 5,206,586 | A * | 4/1993 | Yauch et al. | 324/207.13 |
| 5,463,907 | A * | 11/1995 | Herget et al. | 73/862.392 |
| 5,612,580 | A * | 3/1997 | Janonis et al. | 307/64 |
| 6,118,270 | A * | 9/2000 | Singer et al. | 324/117 R |
| 6,351,117 | B1 * | 2/2002 | Ehling | 324/207.13 |
| 6,529,127 | B2 | 3/2003 | Townsend | |
| 6,533,502 | B2 | 3/2003 | McVay | |
| 7,365,455 | B2 * | 4/2008 | Hamel et al. | 307/151 |
| 2002/0024450 | A1 | 2/2002 | Townsend | |
| 2003/0234730 | A1 | 12/2003 | Arms | |
| 2004/0078662 | A1 | 4/2004 | Hamel | |
| 2005/0017602 | A1 | 1/2005 | Arms | |

OTHER PUBLICATIONS

S.W. Arms, "Power Management for Engergy Harvesting Wireless Sensors," Mar. 9, 2005, SPIE International Symposium on Smart Structures and Smart Materials, San Diego, CA.

D.L Churchill, "Strain Energy Harvesting for Wireless Sensor Networks," SPIE Annual Symposium on Smart Structures and Smart Materials, San Diego, CA, Mar. 2003, San Diego, CA.

C. Townsend et al, "Wireless Sensor Networks," Chapter 22 in the book Sensor Technology Handbook, Edited by John S. Wilson, Elsevier Inc. 2005.

\* cited by examiner

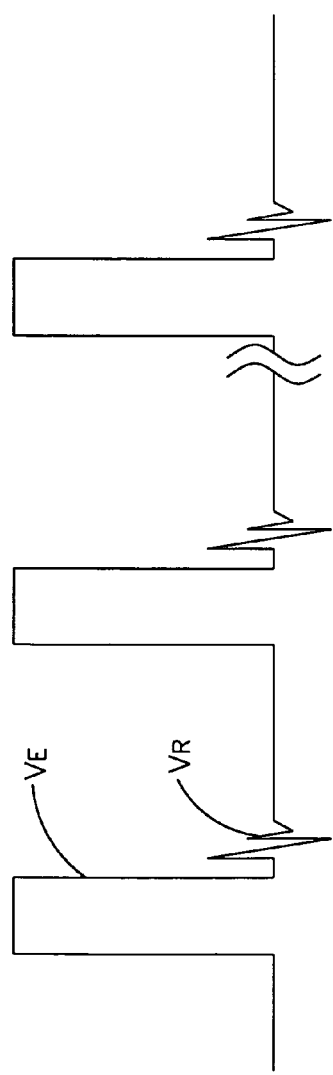
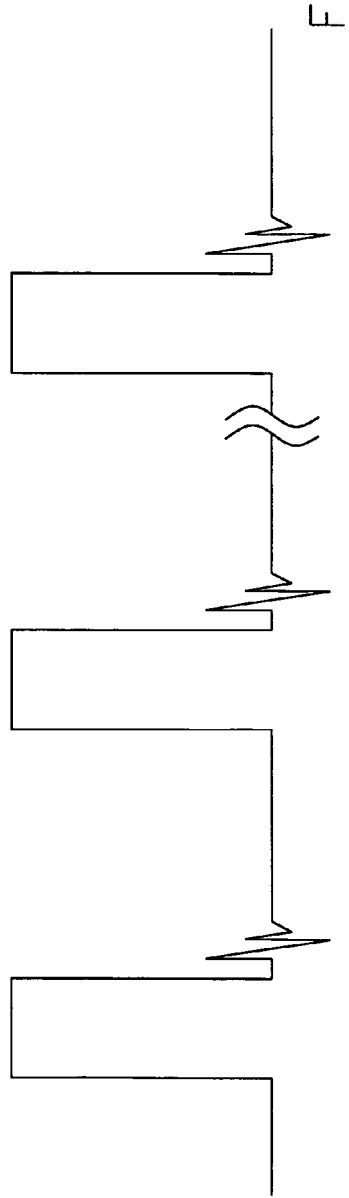
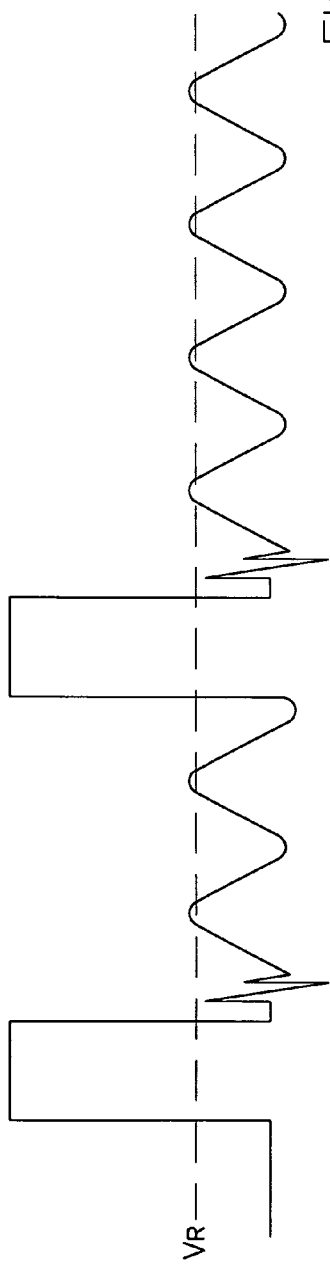
FIG.6a
FIG.6b
FIG.6c

US 7,591,187 B2

WIRELESS VIBRATING STRAIN GAUGE FOR SMART CIVIL STRUCTURES

RELATED APPLICATION AND PRIORITY

This application claims priority of Provisional U.S. Patent Application 60/679,351, filed May 10, 2005, incorporated herein by reference.

FIELD

This patent application generally relates to sensors. More particularly, it relates to a vibrating wire strain gauge.

BACKGROUND

Vibrating wire sensors, also known as acoustic strain gages, have become the most widely used instrument for construction monitoring. For example, vibrating wire sensors have been widely used for measurements in such civil structures as bridges, dams, and buildings. They have been used to monitor stress, strain, deflection, pressure, displacement, fluid level, angular motion, and temperature. Even as advancing technology has produced many types of sensors based on different technologies, the construction and civil engineering industries still view vibrating wire sensors as the best type of sensor for long-term reliability. They are the most trusted and familiar tool in the civil engineering field. They have also been used for measurements on other substrates, such as aircraft and other vehicles, machinery, and pipelines.

Vibrating wire sensors have generally been considered to be quite accurate, able to resolve as little as 0.1 microstrain. They are also robust, packaged to resist corrosion and withstand extreme environmental conditions.

The output of a vibrating wire sensor is an AC electrical signal with a frequency corresponding to the frequency of the vibrating wire. Although amplitude of this signal may deteriorate as this electrical signal is transmitted over a long wire the frequency is maintained, and so the measurement has been especially suitable for wired transmission over long distances.

Vibrating wire sensors include end anchors holding a wire in tension, as described in U.S. Pat. No. 4,074,565, to Harris et al., "Vibratory-Wire Strain Gage," incorporated herein by reference. Typical prior art vibrating wire sensor 22 is also illustrated in FIG. 1. End anchors 24 are attached to structure 26 or other object being measured. These end anchors separate from each other or approach each other as the structure or object experiences forces and moves in response to those forces. The change in separation of the end anchors imparts a change in the natural or resonant frequency of wire 30, going to a higher pitch as anchors 24 are separated and to a lower pitch as they are brought closer together.

One way the resonant frequency of wire 30 has been measured has been to pluck the wire and then to measure the natural frequency of the vibration of the wire as it vibrates freely. Wire 30 has been plucked by fabricating the wire of a magnetically permeable material, such as steel, and providing current in coil 32 mounted adjacent wire 30, as also shown in FIG. 1.

One way of plucking the wire has been to provide sufficient current through the wire to provide a strong enough magnetic field to displace the center of the wire from its resting position. When the current is turned off the wire is released and vibrates.

Another way has been to provide an AC current in the coil that varies with time over a range of frequencies. This scheme recognizes that the wire would readily vibrate, even with a very low energy plucking signal, if the signal is provided at a frequency equal to or sufficiently close to the wire's resonant frequency. However, because the 'Q' of the resonance of the wire in the vibrating wire gage has been extremely high to provide the greatest measurement resolution, the wire in the vibrating wire strain gage is very sensitive to the frequency of the plucking signal. For example, if the excitation frequency is exactly the same as the natural vibration frequency of the vibrating wire, or is within about 1 Hz of the resonance frequency of the vibrating wire, very little power has been needed to excite the wire to vibrate at its resonance frequency. However, if the excitation frequency is more than about 1 Hz away from the resonant frequency of the vibrating wire, a large amount of power into the excitation coil has been required to 'ring' the wire at its natural resonance frequency to a level that can be detected. Thus, when the frequency of the AC current in the coil has been too far from the natural frequency of vibration of the wire, the wire has not vibrated. In this scheme the frequency of the AC current in the coil has been varied until a frequency that is about equal to the natural frequency of frequency of vibration of the wire, or a harmonic, has been reached, which gets the wire vibrating.

Thus, vibrating wire 30 has been plucked by techniques that require a considerable amount of power to be switched into the coil either with a single large current or a succession of AC signals at different frequencies until the right frequency has been reached.

After the plucking signal stops, wire 30 vibrates freely at its resonant frequency for quite some time. The natural frequency of vibration has been detected by a pickup mounted adjacent to the wire. The pickup usually includes permanent magnet 33 located in the center of coil 32. The coil used for pickup can be the same coil as used to pluck the vibrating wire. Alternatively the pickup can be a separate coil from the coil used to pluck the vibrating wire. As steel wire 30 vibrates in relation to the permanent magnet the magnetic circuit coupling between the wire and the permanent magnet changes, inducing an AC current in coil 32 that oscillates with a frequency equal to the frequency of vibration of wire 30. The pickup has been connected to counter 34 through cable 36, and counter 34 determines the frequency of vibration of wire 30 from the frequency of the electrical signal it receives.

Remote reader 38 including hefty power supply 40 has previously been needed to supply the high current level needed for either of the two types of plucking signal. This plucking signal has been transmitted from remote reader 38 over a pair of wires located in cable 36 extending from remote reader 38 to coil 32. Similarly, the electrical signal induced in coil 32 as a result of the vibration of the wire has been conducted back to frequency counter 34 in reader 38 over the same pair of wires in cable 36. In some cases the cable connecting the vibrating wire gage and reader has been many hundreds of feet long. The remote reader has included electronic components for signal conditioning, including amplification, processing, display, recording and counting.

Plucking with either plucking techniques has required relatively high power and energy consumption. Most manufacturers of these available signal conditioners use such large signal pulse excitation, consuming more than about 100 mJ of energy for each reading.

With the need to be able to supply a large amount of energy for plucking the vibrating wire a wired connection to a source of such a large signal has been needed, and there has been no practical way to provide a wireless vibrating wire sensor.

Another important characteristic of vibrating wire sensors has been their sensitivity to temperature. For example, with a steel wire, which has an expansion coefficient of about 11 ppm, a change of 1 degree Celsius produces eleven times as much change in wire resonant frequency as a change of 1 microstrain. Therefore, it has been important to compensate for changes in temperature to provide data that truly indicates the change in strain of the structure. For this reason vibrating wire sensors have been manufactured with a thermistor built into the excitation pickup coil assembly so that temperature can be measured along with frequency and so the frequency measurement can be adjusted for temperature. The thermistor has required its own wire for connection to the reader to accurately provide the temperature reading.

Although vibrating wire sensors have been subject to improvement over the past 60 years since they were first introduced, current technology vibrating wire gages have been large and consume considerable power. The large size and the high power consumption of vibrating wire signal conditioners has prevented the emergence of satisfactory wireless units. The need for the wiring to provide the power from the reader needed for plucking the wire, to transmit the frequency data back to the reader, and to transmit temperature data back to the reader has added considerably to the cost of using the gages, limited the number of gages that could be provided to monitor a structure, limited the types of structures that can be monitored, limited the frequency and duration of monitoring, and limited the ability to monitor during actual operation.

It is worth noting that one of the biggest issues arising concerning vibrating wire sensors on a construction site relates to cabling for the sensors. In many instances vibrating wire sensors are located in areas that are difficult or dangerous to access, hence long cables frequently connect the sensors to remote readers. Cable routing has to be planned carefully to ensure that cables can be protected. The cost of the cable can often add 50 to 100% of the cost of the vibrating wire sensor. The cost of designing the routing, installing the cable, and providing and installing suitable conduit or other protective measures can add an additional 100 to 400% of the cost of the vibrating wire sensor.

Thus a better scheme is needed to reduce size, reduce power, reduce or eliminate the wiring, reduce complexity, and reduce cost, and this scheme is provided by this application.

SUMMARY

One aspect of the present patent application is a gauge, comprising a wire, a coil, a processor, and a power supply. The wire is mounted in said housing to vibrate at a natural frequency. The coil is magnetically coupled to the wire. The processor is connected to provide a train of pulses to said coil. The processor is further connected to receive a signal between pulses of the train of pulses indicating that the wire is vibrating.

Another aspect of the present patent application is a gauge, comprising a housing. The housing including wire, a coil, and a processor. The wire is mounted to vibrate at a natural frequency. The coil is magnetically coupled to the wire. The processor is connected to provide an excitation to the coil. The processor is further connected to receive a signal indicating that the wire is vibrating.

Another aspect of the present patent application is a gauge for measuring a property of a structure, comprising a wire, a coil, a switch, a processor, and a power supply. The wire is mounted to vibrate at a natural frequency. The switch is connected to the power supply and to the coil to provide current to the coil when the switch is closed. A control terminal of the switch is connected to the processor. The coil is magnetically coupled to the wire. Timing of closing and opening the switch is controlled by a signal from the processor to provide a train of pulses to the coil having a pulse frequency. The coil emits a train of magnetic pulses at the pulse frequency for stimulating the wire to vibrate.

Another aspect of the present patent application is a method of making a measurement. The method includes providing a wire, a coil, a processor, and a power supply. The wire is mounted to vibrate at a natural frequency. The coil is magnetically coupled to the wire. A train of pulses is provided to the coil, wherein the train of pulses is derived from the power supply under control of the processor. A signal derived from vibration of the wire is received between pulses of the train of pulses.

Another aspect of the present patent application is a method of making a measurement. The method includes providing a housing, the housing including a wire, a coil, and a processor. The wire is mounted in the housing to vibrate at a natural frequency and the coil is magnetically coupled to the wire. An excitation signal derived from the processor is provided to the coil. A signal derived from vibration of the wire is received.

Another aspect of the present patent application is a method of making a measurement. The method includes providing a wire, a coil, a processor, a switch, and a power supply. The wire is mounted to vibrate at a natural frequency. The coil is magnetically coupled to the wire. The switch includes a control terminal connected to the processor. The switch is connected to the power supply and to the coil to provide current to the coil when the switch is closed. A first signal from the processor to the control terminal is provided to repeatedly close and to open the switch to provide a train of current pulses from the power supply to the coil. The first signal has a first pulse frequency. The train of current pulses has the first pulse frequency and the coil emits a train of magnetic pulses at the first pulse frequency for stimulating the wire to vibrate.

BRIEF DESCRIPTION OF THE DRAWINGS

The foregoing will be apparent from the following detailed description as illustrated in the accompanying drawings, in which:

FIGS. 6a-6c are timing diagrams showing repetitive excitations at different excitation times and excitation periods until the wire is set sufficiently in motion;

FIG. 10 is a top view of a network of the multiple vibrating wire sensors connected to a PC board of FIG. 9 and showing the base station that each of the antennas transmits data to;

DETAILED DESCRIPTION

Figure 1:
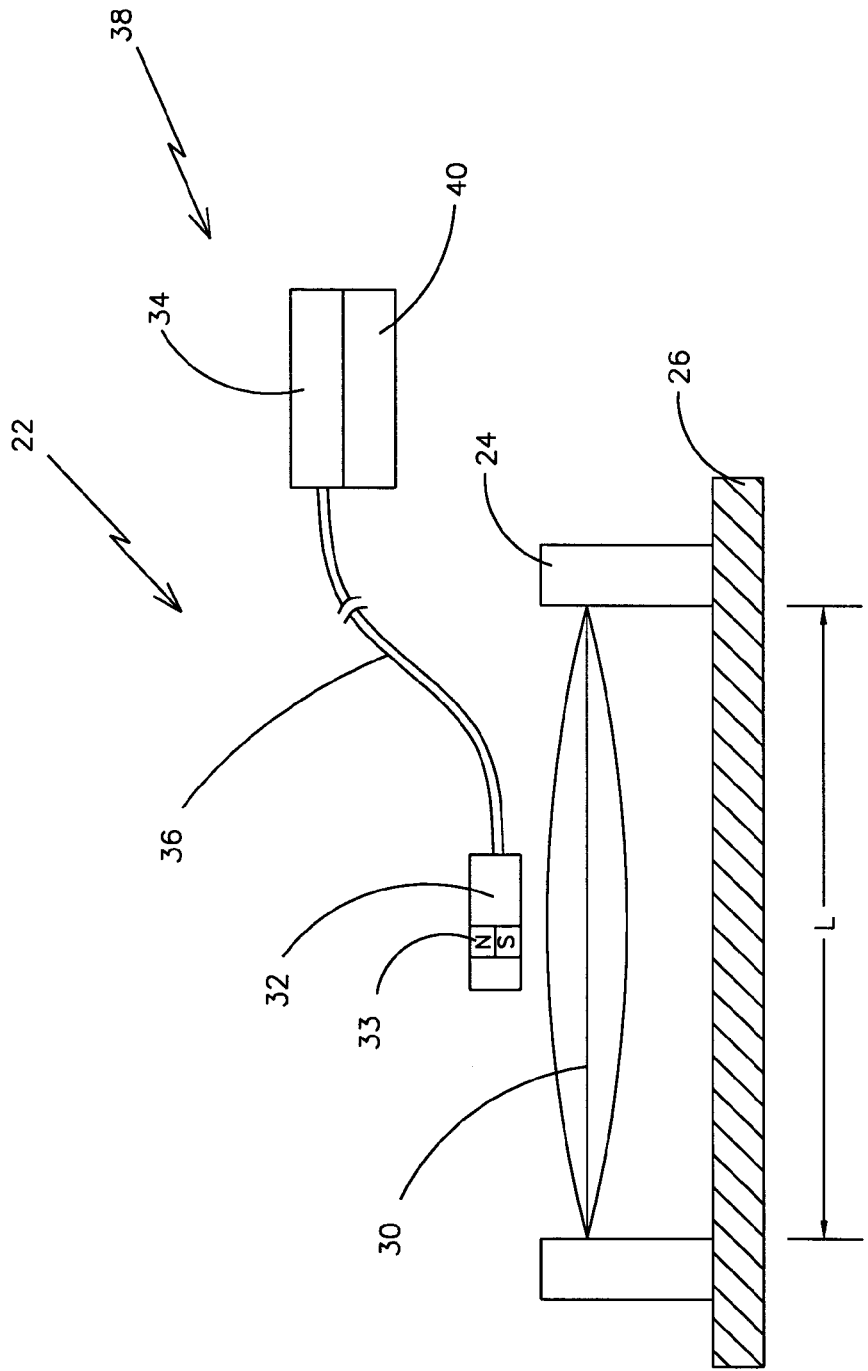
FIG. 1 is a side view of a prior art vibrating wire strain gauge and coil mounted to a structure and wired to a reader having a frequency counter and a power supply.

The present application provides a system for plucking a vibrating wire sensor and then for sensing the natural frequency of vibration of the wire that uses much less power than any previous system. The miniaturized system significantly reduces the power needed for plucking the vibrating wire.

An algorithm is presented herein that provides digital signals from a microcontroller for turning on a switch and providing short current pulses in the coil. The microcontroller iteratively adjusts characteristics of the current pulses until stimulation that is close to the natural vibration frequency of the wire is provided and the wire vibrates.

For exciting the wire into motion, a current pulse of relatively small amplitude is repeatedly switched into the coil from a power supply and switched off. In one embodiment, each time the current is switched off a detection circuit is activated to detect vibration in the wire. Switching and detection timing are both controlled by a microcontroller.

The excitation current pulses create a weak magnetic field that draws the wire toward the coil a very small distance. If the rate these current pulses are applied is equal to the natural resonant frequency of the wire, or a harmonic multiple or subharmonic of the resonant frequency of the wire, mechanical vibration of the wire will quickly grow, becoming large enough in amplitude to be detected by current induced in the coil during times when the excitation current is off.

In one embodiment the detection step occurs in between every excitation pulse. The timing of the excitation and detection cycles is tuned by the microcontroller to excite the wire into detectable level of vibration using much less power consumption than previous techniques. The power required to excite the wire into vibration is many orders of magnitude lower when the pulses are applied close to the natural resonant frequency of the wire, or a frequency that is harmonically related to the natural resonant frequency of the wire. The present applicants have been able to provide excitation pulses using an amount of power so low that they would only be successful at exciting the wire to vibration when applied at the natural resonant frequency of the wire. And they have provided a digital way to close in on this frequency and to narrow the range of steps needed to close in when embarking on subsequent measurements after the resonant frequency has once been found, further lowering the power consumption.

The present applicants found power consumption during sleep mode was only 90 uW. They provided that the read to sleep ratio was programmable. In one mode of operation they took readings every second, and the device drew 9 mW average power, which is about an order of magnitude improvement over previous systems. In another mode of operation they took readings every 15 minutes, and the average power for reading and sleeping portions combined over the 15 minute period was 100 uW, which is about three orders of magnitude improvement over previous systems. A calculation of battery life in each mode is provided herein below and demonstrates that extremely long battery life can be achieved.

Figure 2A:
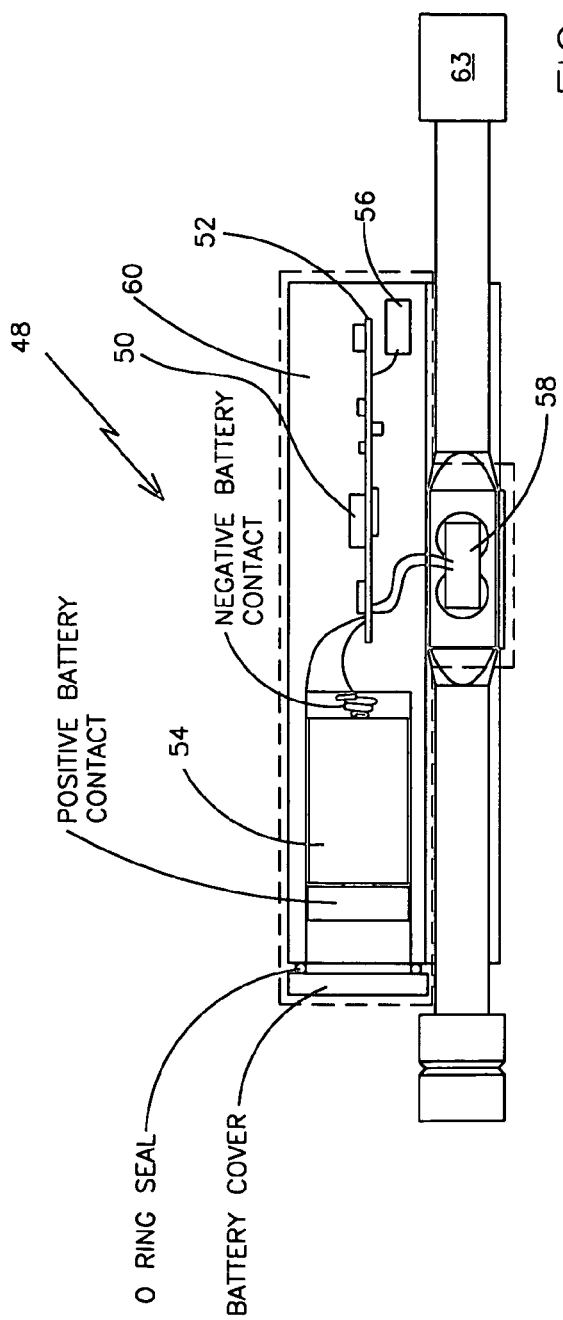
FIGS. 2a, 2b are top and front views of a vibrating wire strain gauge and coil of the present application mounted in a housing with a PC board for holding electronic components for signal conditioning, processing and wireless transmission, a battery, and an antenna for facilitating wireless transmission to a reader.
Figure 2B:
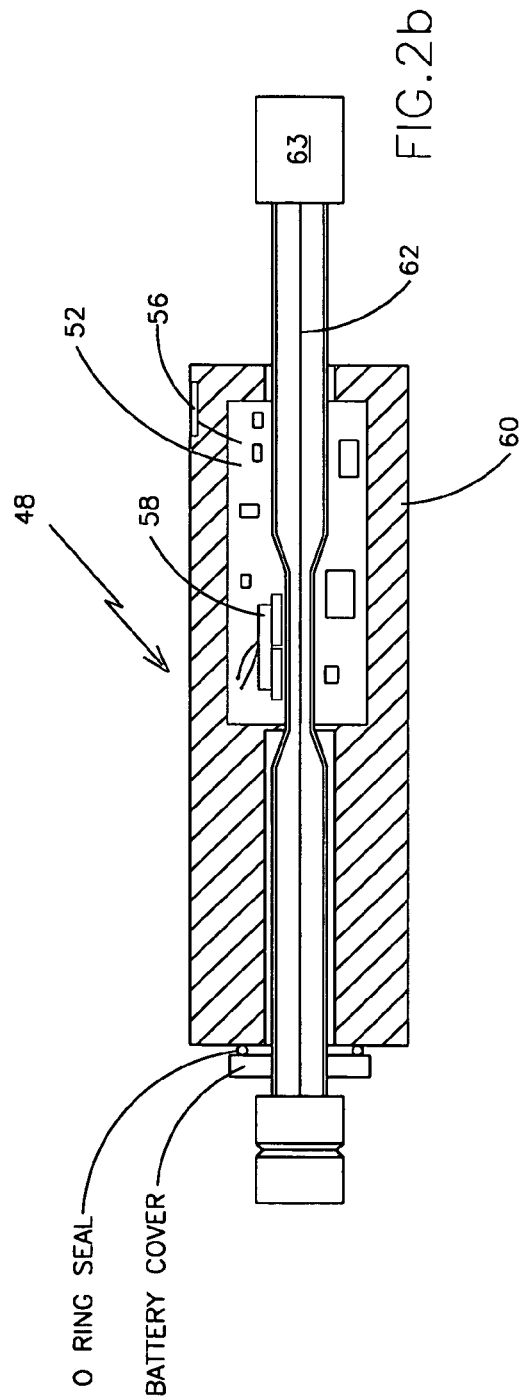
Figure 3:
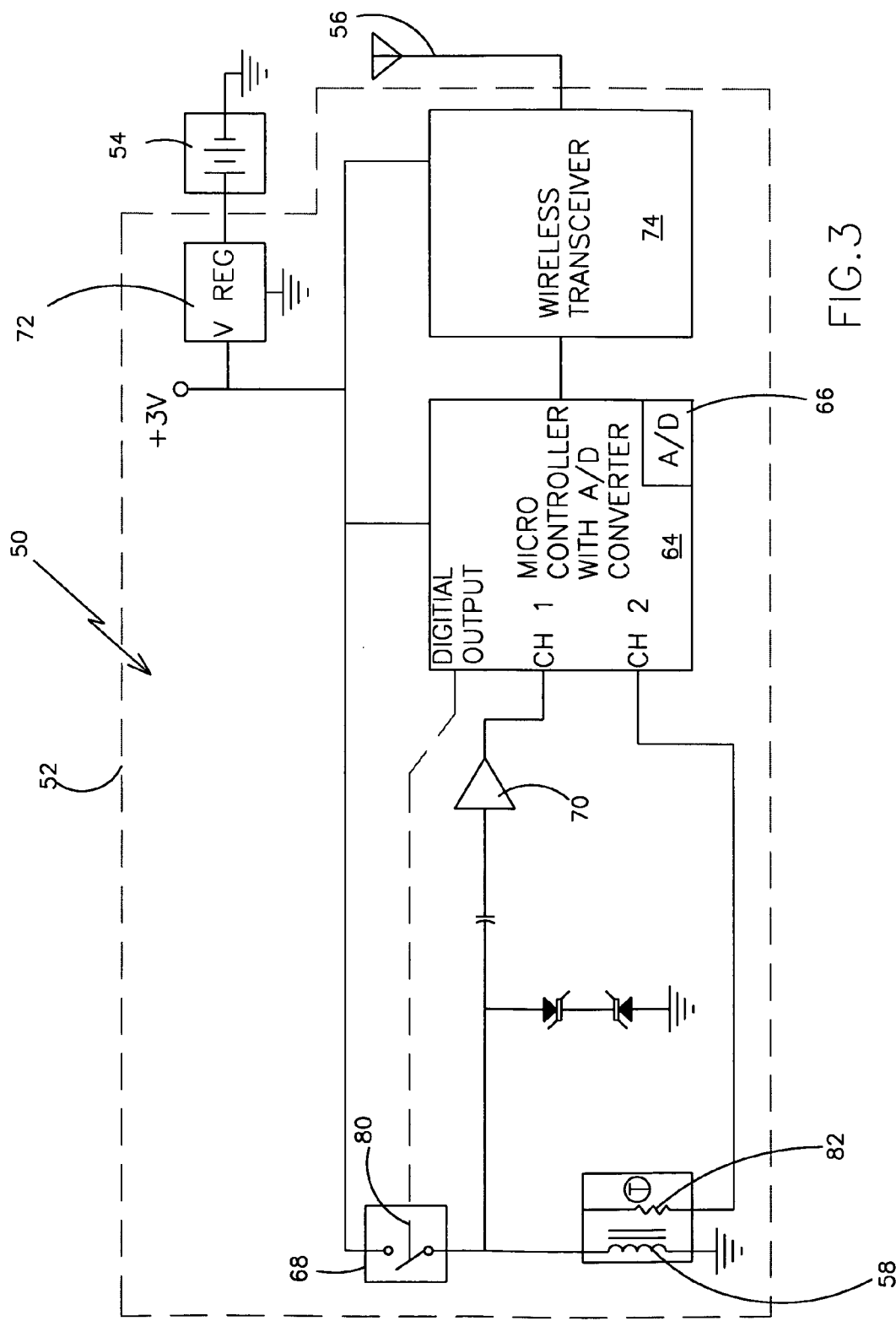
FIG. 3 is a block diagram of the components on the PC board and their connection to the coil, the battery and the antenna.

One embodiment of vibrating wire system 48 provides additional miniaturized electronics 50 on circuit board 52, battery 54, and antenna 56, along with the plucking and sensing coil 58 within housing 60 with vibrating wire gage 62, as shown in FIGS. 2a, 2b. Vibrating wire 62 is attached to end anchors 63 that are connected to a structure (not shown) being measured. On board electronics 50 on circuit board 52 includes microcontroller 64 with A/D converter 66, electronic switch 68, such as a transistor, operational amplifier 70, voltage regulator 72, and wireless transceiver 74, as shown in FIG. 3. The presence of the wireless transmitter or transceiver, along with the other on-board electronics, eliminates the need for a cable extending to the reader. The present patent application, by substantially lowering the power requirement allows for wireless transmission, solving the cabling problem of vibrating wire sensors, allowing many more of them to be used, and at substantially lower cost.

Figure 4:
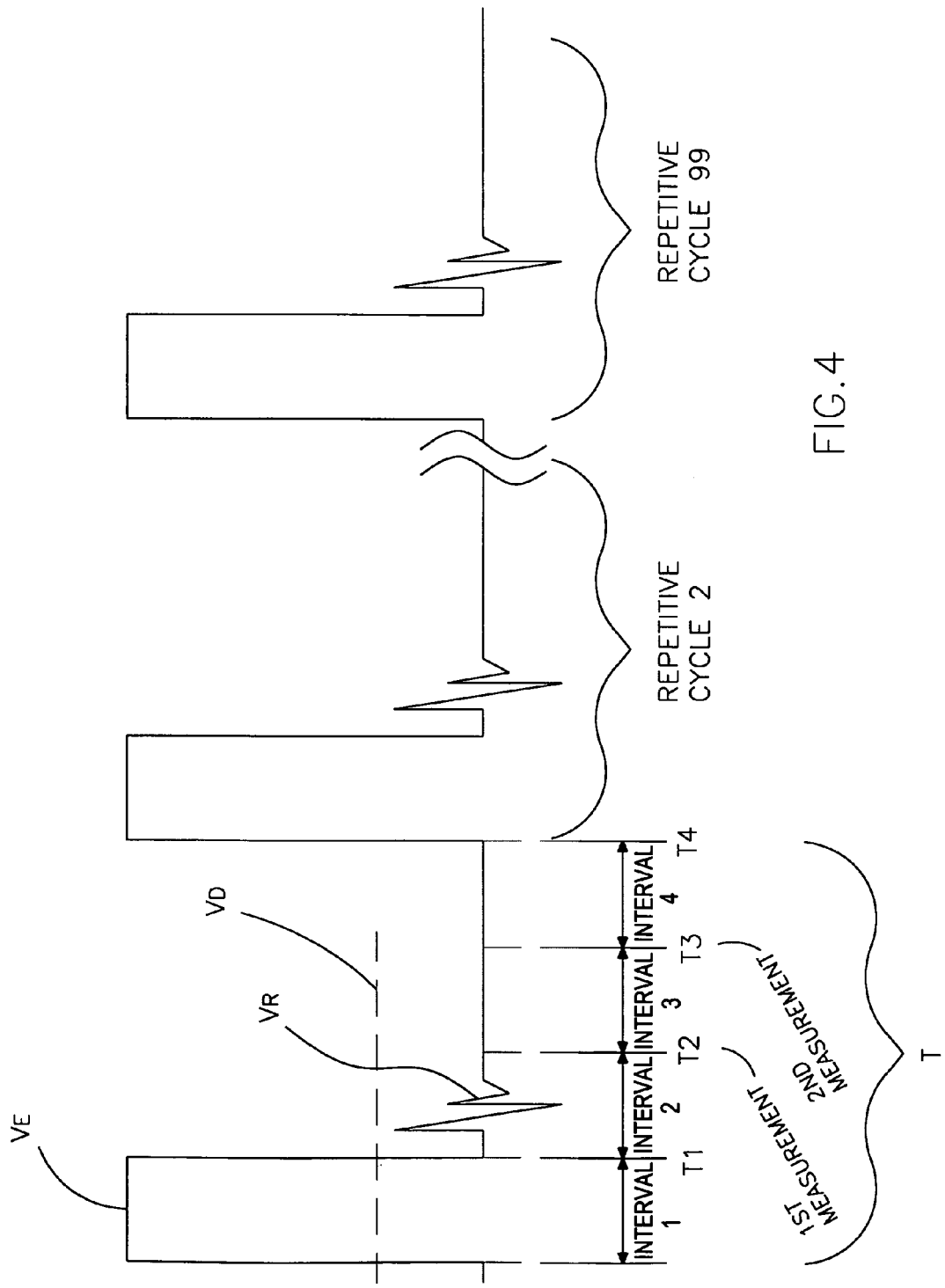
FIG. 4 is a timing diagram showing repetitive cycles of excitation for gradually changing excitation times and gradually changing excitation periods to set the vibrating wire vibrating at its natural frequency which is then detected during a detection interval.

Switch 68 is a three terminal device for providing current from battery 54 to coil 58 with control terminal 80 connected to receive a digital signal from microcontroller 64. In operation, as provided by the digital output signal from the microcontroller 64, electronic switch 68 periodically switches a plucking current pulse, provided by battery 54 and voltage regulator 72, into coil 58 to provide the plucking excitation to adjacent vibrating wire 62. Electronic switch 68 is closed for an excitation time $T_1$ and an excitation period T, as shown in FIG. 4, as provided by the digital output signal of the microcontroller.

The vibrating wire may or may not be set vibrating at its natural frequency by a train of plucking pulses having a particular excitation time and period. During time that electronic switch 68 is open and the plucking current to coil 58 is off wire 62 is free to vibrate at its natural frequency. Detection of current induced in coil 58 can be used to determine whether wire 62 was set vibrating. Measurement of the frequency of the AC current induced in coil 58 can also be used to precisely determine the frequency of vibration of vibrating wire 62.

The present applicant recognized that he could substantially reduce the power required to pluck coil 58 by iteratively providing trains of low energy pulses with gradually changing excitation periods T. With this iterative process under the control of microcontroller 64, eventually a train of pulses with excitation period T' that can set vibrating wire 62 vibrating will be reached. Even with low energy provided to wire 62 by coil 58 in this scheme once microcontroller 64 directs switch 68 to provide the train of pulses with the correct excitation period T' wire 62 will start vibrating. The present applicants also provided a way to detect whether wire 62 is vibrating during each iterative pass at each of the different excitation periods T. They also provided a way to accurately measure the frequency of vibration of wire 62 once it starts vibrating. They also provided for including and correcting for temperature. Once a natural frequency of vibration is found for a particular vibrating wire they also provided for reducing the range of excitation periods T used in the iterative process as corrected for temperature to speed up subsequent measurements used to detect changes in stress on the wire that may have been caused by strain in the structure to which wire 62 is mounted.

Figure 5:
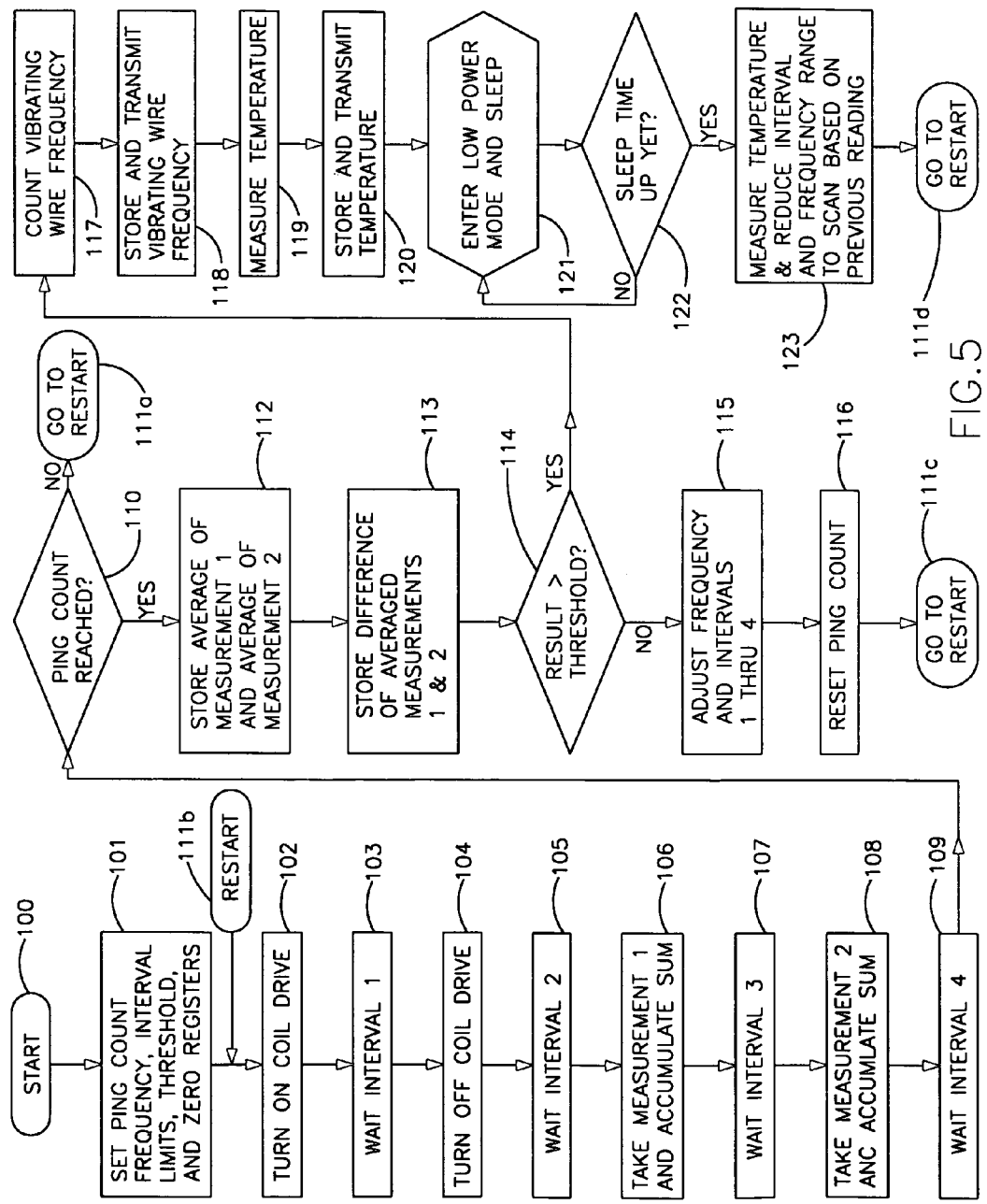
FIG. 5 is a flow chart illustrating the process for operating the device shown in the block diagram of FIG. 3 to get the vibrating wire to vibrate and to determine the natural frequency of vibration and to make correction for temperature.

One embodiment of the process is illustrated in the flow chart in FIG. 5 and in the timing diagrams of FIG. 4 and FIGS. 6a-6c. The process begins when vibrating wire system 48 is put in place or the system is queried, as shown in box 100 of FIG. 5. The process may be initiated when microcontroller 64 is interrogated by the reader or when microcontroller 64 awakens from sleep mode, as described herein below.

Microcontroller 64 sets the ping count, which is the number of pulses to be applied to excitation coil 58 through electronic switch 68 at a particular excitation period T. The ping count may be set at about 100 pulses. It can range from about 40 to about 150, and any number can be selected. The lower the ping count the lower the power consumption. The higher the ping count the higher the amplitude of vibration of the vibrating wire which enhances the ability to detect vibration. Microcontroller 64 also sets the initial excitation period T, the excitation time $T_1$, the detection times $T_2$ and $T_3$, and the detection threshold $V_D$, as shown in FIG. 4 and in box 101 of FIG. 5. Detection after each pulse does not involve additional energy consumption because the microcontroller and other electronics are already active to provide pulses. However, microcontroller 64 need not be programmed to provide detection after each pulse, as provided herein. Alternatively, detection can be provided after a number of pulses. Microcontroller 64 also zeros memory registers used in the process, as described herein below.

Next microcontroller 64 sends a digital control signal to electronic switch 68 to close switch 68 and turn on the current to coil 58, as shown in box 102, waits time interval 1 until time $T_1$, as shown in box 103, and sends a digital control signal to electronic switch 68 to open switch 68 and turn off the current to coil 58, as shown in box 104, and as shown by the voltage pulse $V_E$ lasting a time $T_1$ shown in FIG. 4 and FIG. 6a. The time voltage pulse $V_E$ lasts is adjusted as period T changes so it is one quarter of the period T of the train of pulses. The excitation time can be set to other values as well as long as it is less than or equal to one quarter of the period T.

The detection of wire vibration phase now begins, with microcontroller 64 waiting time interval 2 until time $T_2$, as shown in box 105. At this point a first measurement of voltage across coil 58 is made and added to a first memory register, as shown in step 106. Time $T_2$ is substantially longer than the time for any voltage ringing $V_R$ in coil 58 arising from excitation $V_E$ to die out, shown in FIG. 6a. Voltage measured at time $T_2$ will be compared with voltage later measured at time $T_3$ to provide indication of whether voltage was induced in coil 58 by vibration of wire 62. Time $T_2$ is set to a time when vibration of wire 62 would be about at its zero point in amplitude if wire 62 was set into vibration by excitation current pulse $V_E$.

Microcontroller 64 now waits a time interval 3 until time $T_3$, as shown in box 107, taking a second measurement of voltage in coil 58 and adding this measurement to a second memory register, as shown in step 108. Interval 3 is about a quarter of a vibration period of the period T of the train of pulses. Thus, $T_3$ would be a time when vibration of wire 62 would be about at its maximum amplitude if wire 62 had been set into vibration by excitation current pulse $V_E$. Thus, a difference in amplitude should be detected from taking the difference in voltage at times $T_2$ and $T_3$. If the difference in the voltage measured at time $T_3$ and the voltage measured at time $T_2$ is above predetermined detection threshold $V_D$ then one can conclude that wire 62 was set in vibration by the excitation pulse train having period T.

Microcontroller 64 now waits a time interval 4 until time $T_4$, as shown in box 109, to complete the designated time period between pulses T. If the ping count set in box 101 has not been reached as shown in boxes 110, 111a, the process goes to restart, box 111a, 111b, the next pulse of current is provided as shown in box 102 and in FIGS. 4, 6a and the process of boxes 102-110 repeats until the ping count has been reached.

Once the ping count has been reached the average of the first measurement is determined and the average of the second measurement is determined, and these averages are both stored in a memory location, as shown in box 112. The difference between these two average values is determined and stored in a memory location as well, as shown in box 113.

Next the microcontroller determines whether the difference between the first and second voltage measurements is greater than the threshold, as shown in box 114, indicating that wire 58 has been set into vibration by the impulses. If less than the threshold, indicating that wire 58 has not been set into vibration by the impulses with the particular excitation period T, then the excitation period T and the time intervals are adjusted, as shown in box 115, the ping count is reset, as shown in box 116, and the process returns to restart, as shown in boxes 111c (which is the same as box 111b) and as shown in FIG. 6b. Thus, excitation current pulses are resumed with new parameters, and we once again determine whether these excitation current pulses set the wire into vibration, as shown in boxes 102-114. The new parameters with each successive measurement may involve increases in the period, as shown in FIGS. 6a-6c.

Once the result in box 114 shows that the difference between the first and second voltage measurements is greater than the threshold, as shown in FIG. 6c, the frequency of vibration of vibrating wire 62 is counted, as shown in box 117, and the vibration frequency is stored in a memory location and transmitted, as shown in box 118. The temperature in the vicinity of coil 58 is measured using temperature sensor 82 shown in FIG. 3 and in box 119, and this temperature measurement is stored in a memory location and transmitted, as shown in box 120.

Once the vibration frequency of wire 62 and the temperature adjacent coil 58 and wire 62 has been measured and transmitted, microcontroller 64 can be entered into low power mode and other electronics on PC board 52 can be turned off to conserve energy, as shown in box 121. This sleep mode can include a timer, and microcontroller 64 can wake itself up and turn on other electronics when a preset time has been reached, as shown in box 122. If the time has not been reached microcontroller 64 remains in sleep mode. If the time has been reached, the temperature is measured again, as shown in box 123. Based on that measurement the range of adjustment of excitation times $T_1$ and excitation periods T can be reduced before restarting stimulating wire 62 with pulses as shown in box 111d, 111b, and as described in the process of boxes 100 to 120 to measure the wire's new vibration frequency. The range of excitation times $T_1$ and excitation periods T can be reduced after a first reading of the vibrating wire because without a change in strain the approximate value can be predicted from the temperature measurement, saving time and power in this iterative process for subsequent readings.

The present applicants found that by providing control in a programmable microcontroller different methods of plucking and detecting could be used. While applicants believe the algorithm presented herein above provides a rapid and low power method of measuring resonance frequency of the vibrating wire, other advantages can be achieved with other algorithms for plucking and detecting. For example, detection need not be provided after each pulse, as described herein above. In an alternate embodiment detection can be provided only after providing multiple pulses at one frequency.

Op amp 70 on circuit board 52 amplifies any AC electrical signal induced and provides the amplified signal to A/D converters 66 integrated in microcontroller 64. In addition to providing A/D conversion, microcontroller 64 provides capture-compare (CCP) functions 88 for frequency counting to accurately determine the frequency of the AC signal induced in coil 58. A capture-compare function is a feature built into many microcontrollers that allows accurately measuring the frequency of zero crossings of the digitized AC signal coming from an A/D converter, which corresponds to the frequency of the AC signal and to the frequency of the vibrating wire.

As described herein above, microcontroller 64 iteratively adjusts a digital output signal to electronic switch 68 that controls the excitation period and the excitation pulse width to provide excitations at successively longer or shorter excitation periods until the excitation is sufficiently close to the resonant frequency of the wire that voltage is induced in coil 58 and is detected above a threshold. This process allows for a very low cost, low power, and highly software configurable implementation of a vibrating wire sensor signal conditioner.

Figure 7:
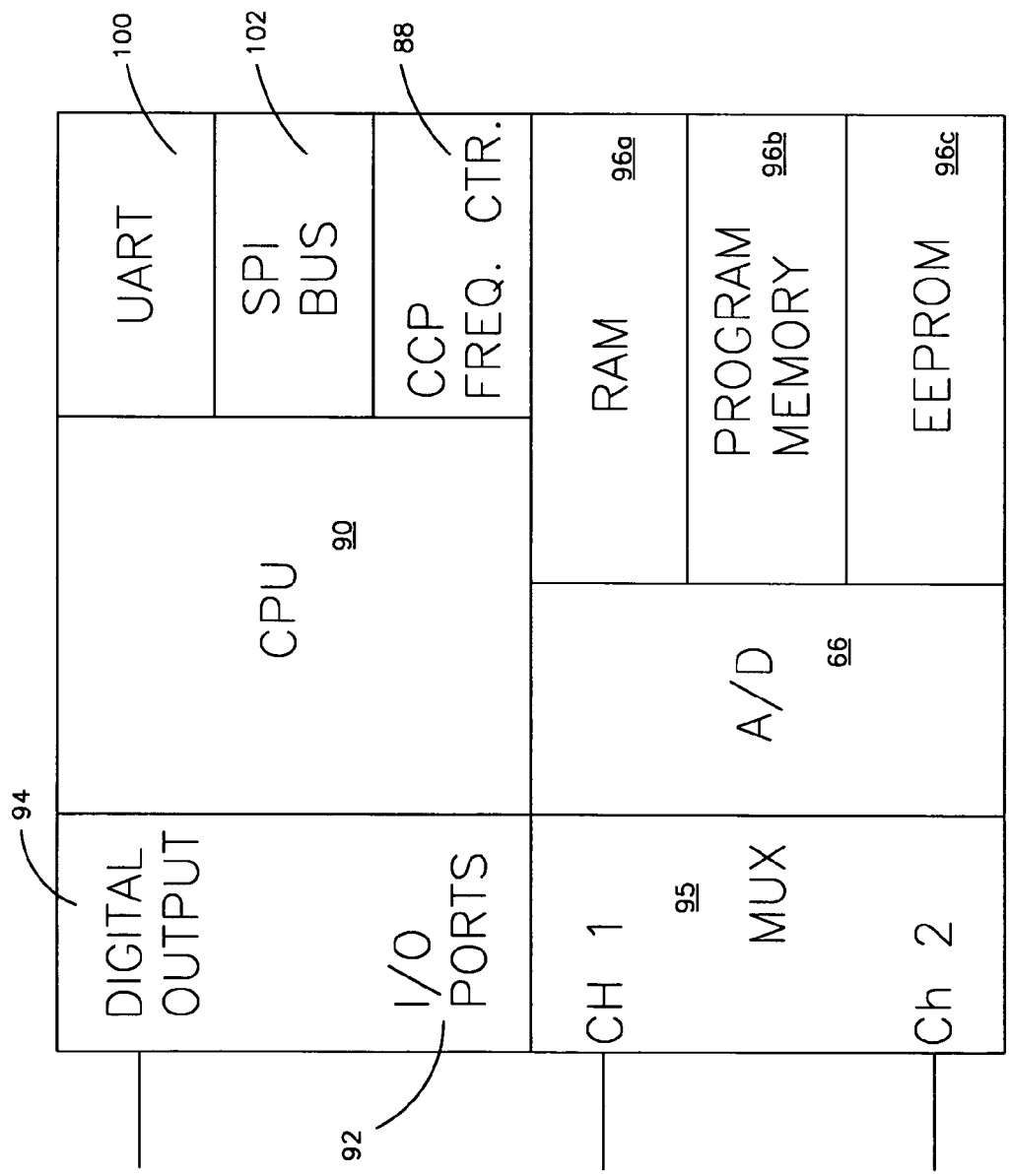
FIG. 7 is a schematic diagram of the microcontroller showing a microprocessor (CPU), a memory, an A/D converter, a multiplexor, a frequency counter, I/O ports, a digital output, and outputs, such as a universal asynchronous receiver transmitter (serial port) and a serial peripheral interface (SPI) bus.

Microcontroller 64 also includes CPU 90, I/O ports 92, including digital output 94 that is connected to electronic switch 68, MUX 95, including inputs CH1 and CH2 that receive signals from the amplifier and the thermister, A/D converter 66, memory, including RAM 96a, program memory 96b, and non-volatile memory 96c, such as EEPROM, and outputs 98, including serial ports such as universal synchronous receiver transmitter (UART) 100 and serial peripheral interface (SPI) bus 102, as shown in FIG. 7.

In preliminary tests, the present applicants demonstrated that when the excitation pulse rate and width are sufficiently close to the natural resonant frequency of vibrating wire 62, wire 62 will vibrate at its natural frequency for several hundred cycles after excitation pulses E are stopped. The voltage induced in coil 58 by these vibrating wire cycles was amplified in amplifier 70 and converted to digital values in A/D converter 66. Their frequency was counted by microcontroller 64, thereby determining the resonant frequency of vibrating wire 62. The frequency was counted in microcontroller 64 with capture-compare registers 88 in which one register counted up the number of cycles of the vibrating wire signal from the number of zero crossings and another counted up elapsed time from an internal clock.

The temperature of the vibrating wire assembly can be measured using temperature sensor 82, such as a thermistor, which is included in excitation coil 58 of vibrating wire system 48. The measured resonant frequency and associated temperature readings can be stored in non-volatile memory 96c within microcontroller 64. The temperature reading can be used to correct the strain measurement using a well known equation that includes the change in temperature and the difference in the coefficient of thermal expansion between the wire and the structure to which it is mounted.

$$\Delta\mu\epsilon_{corrected} = \Delta\mu\epsilon - (TC_s - TC_g) \times (Temp_1 - Temp_0)$$

where $\Delta\mu\epsilon$ is the change in strain, $TC_s$ is the thermal coefficient of the structure, $TC_g$ is the thermal coefficient of the vibrating wire gauge which is 10.8 $\mu\epsilon/°$ C. for a steel wire vibrating strain gauge, $Temp_1$ is the current measured temperature and $Temp_0$ is the initial measured temperature.

This equation can be provided as an algorithm in microcontroller 64 or a look-up table providing this information can be used. Using a prototype wire strain gauge prototype, that corrected for temperature difference using the algorithm, the strain was logged to local non-volatile memory 96c, which was a flash EEPROM. The values were also transmitted over a serial port to a personal computer. Microcontroller 64 was used to control power to amplifier 70. In a wireless embodiment, microcontroller 64 could be used control power to both amplifier 70 and wireless transceiver 74 to reduce power consumption when these devices were not needed. In the prototype sleep mode was used for microcontroller 64 to minimize the power consumed.

A wireless vibrating wire strain gauge of the present patent application is expected to perform in an operating temperature range of −40 to +80 deg C., provide a strain measurement range of +/−2500 microstrain, and a strain measurement resolution of +/−2 microstrain. The temperature measurement accuracy is expected to be 0.5 degrees C. The prototype device was operated with a sample rate of 1 Hz (mode 1), matching typical existing conventional vibrating wire gauges. It was also operated with a sample rate of one sample every 15 minutes (mode 2), which is used for long term applications. The accuracy is expected to be +/−5 microstrain or better. A 2.4 Ghz direct sequence spread spectrum RF transmitter, according to IEEE 802.15.4 will be used with an RF transmitter range of 150 meters, line of sight. A 2.4 GHz, direct sequence spread spectrum RF receiver, IEEE 802.15.4 will be used. A serial USB output base station available off-the-shelf from MicroStrain, Inc., Williston Vt. will be used to receive transmissions from the RF transmitter. Average power consumption of the VSG-LINK prototype system operating in mode 1 was 9 mW. In mode 2 average power consumption was 0.09 mW. The power source for the VSG-LINK can be a single AA LiThChl battery, made by Tadiran, that had a 2400 ma-hr capacity. The battery life in mode 1 was calculated to be 800 hours or about 1 month. In mode 2 battery life was calculated to be 80,000 hours or about 9 years. A transceiver can be used in place of a transmitter to provide two-way communication.

Figure 8:
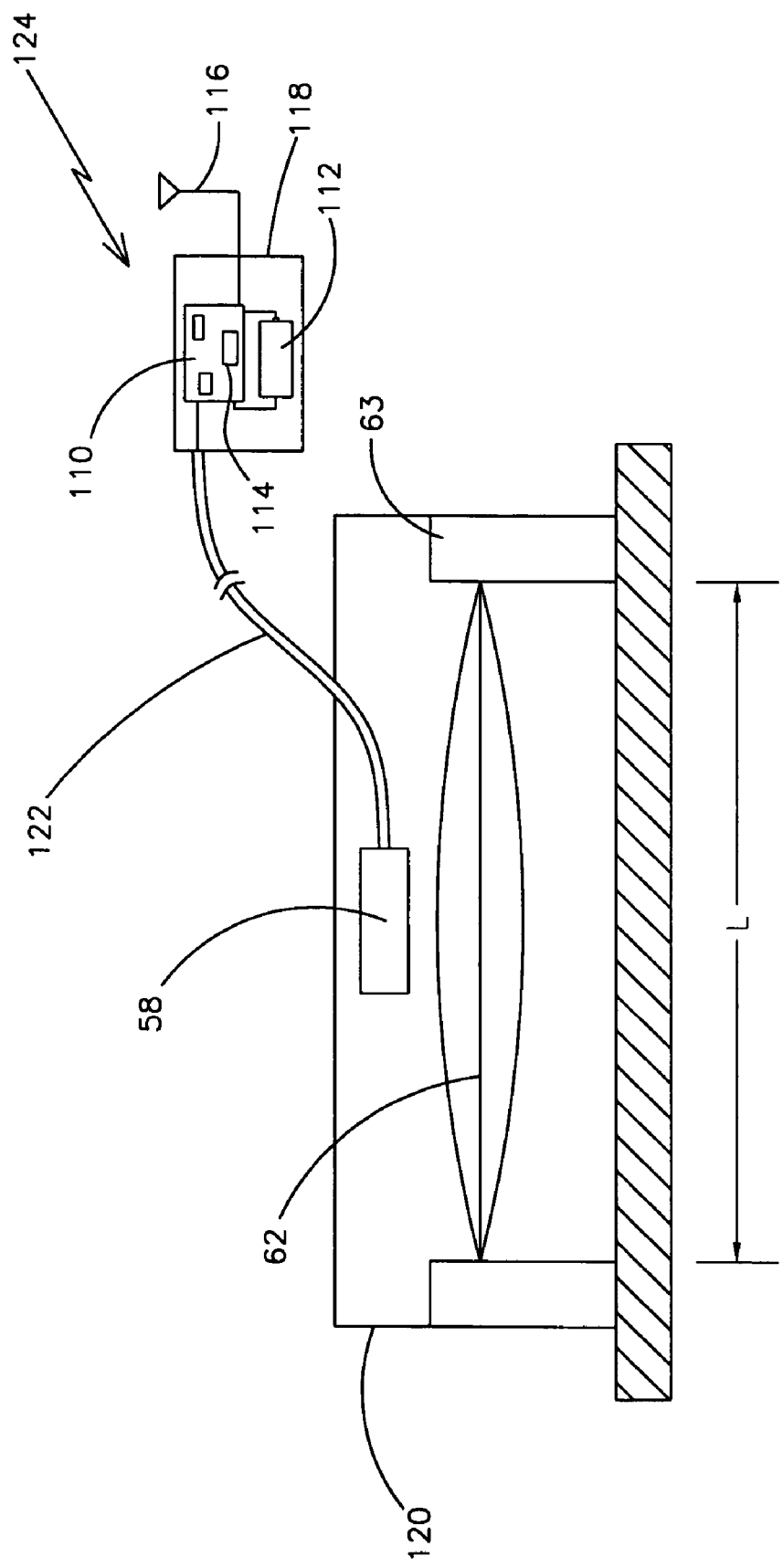
FIG. 8 is a side view of a vibrating wire strain gauge and coil mounted to a structure and wired to a separate housing having a PC board of the present application with its vibrating wire signal conditioner, transmitter, and battery power.

One alternative to the design shown in FIG. 2a, 2b separates out the carrier for the electronic components, which may be printed circuit (PC) board 110, battery 112, transmitter 114, and antenna 116 in housing 118 separate from housing 120 for coil 58 and vibrating wire 62, as shown in FIG. 8. In this two-housing embodiment, signal cable 122 is used to connect vibrating wire signal conditioner 124 to coil 58 adjacent vibrating wire 62. This two-housing embodiment may be used when vibrating wire sensor 126 is installed in a location, such as underwater or within concrete, in which radio transmissions may be blocked but in which a wire connection can be made.

Figure 9:
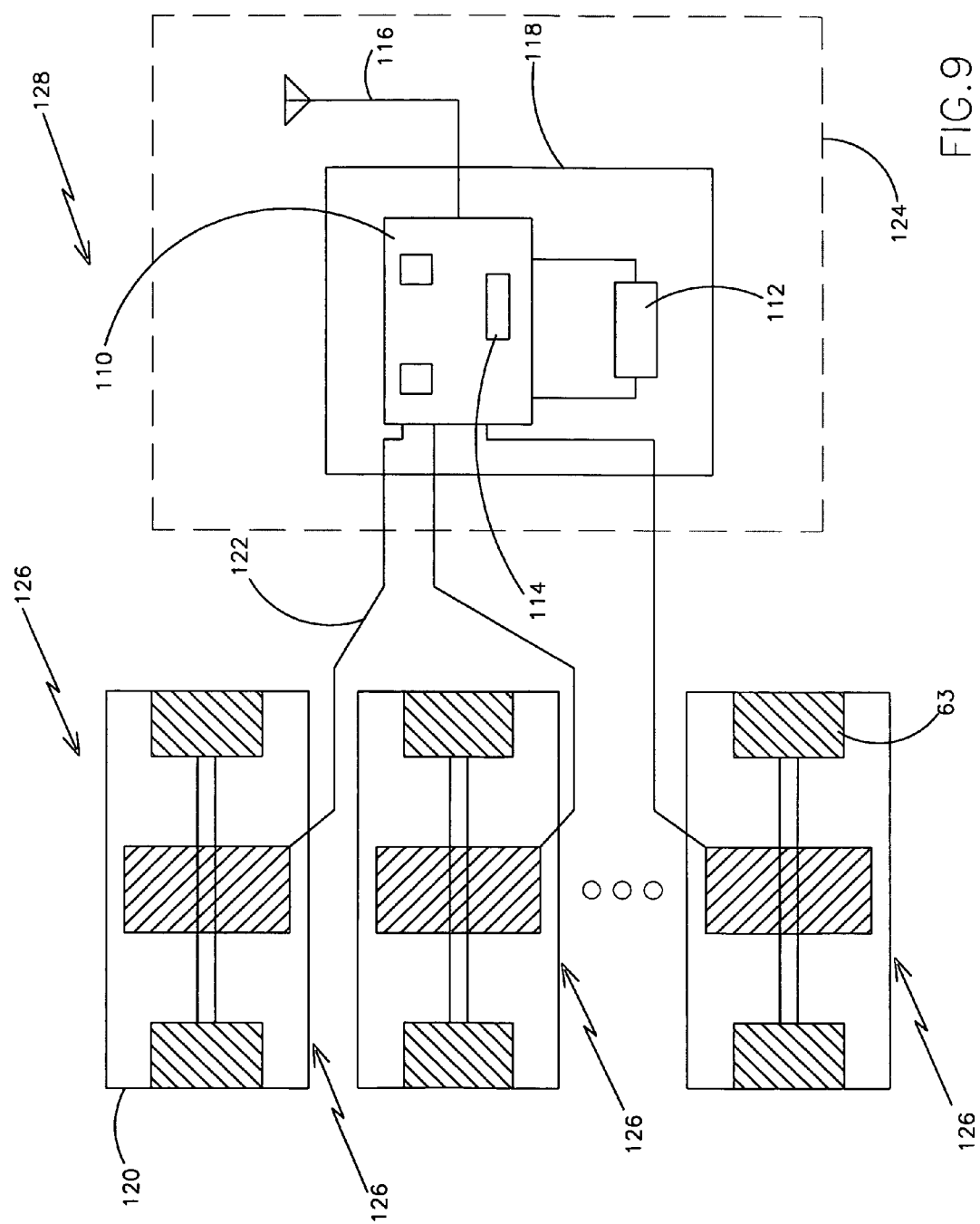
FIG. 9 is a top view of multiple vibrating wire sensors, each connected to a PC board of the present application, wherein the PC board has a transmitter and antenna for wirelessly transmitting data.
Figure 10:
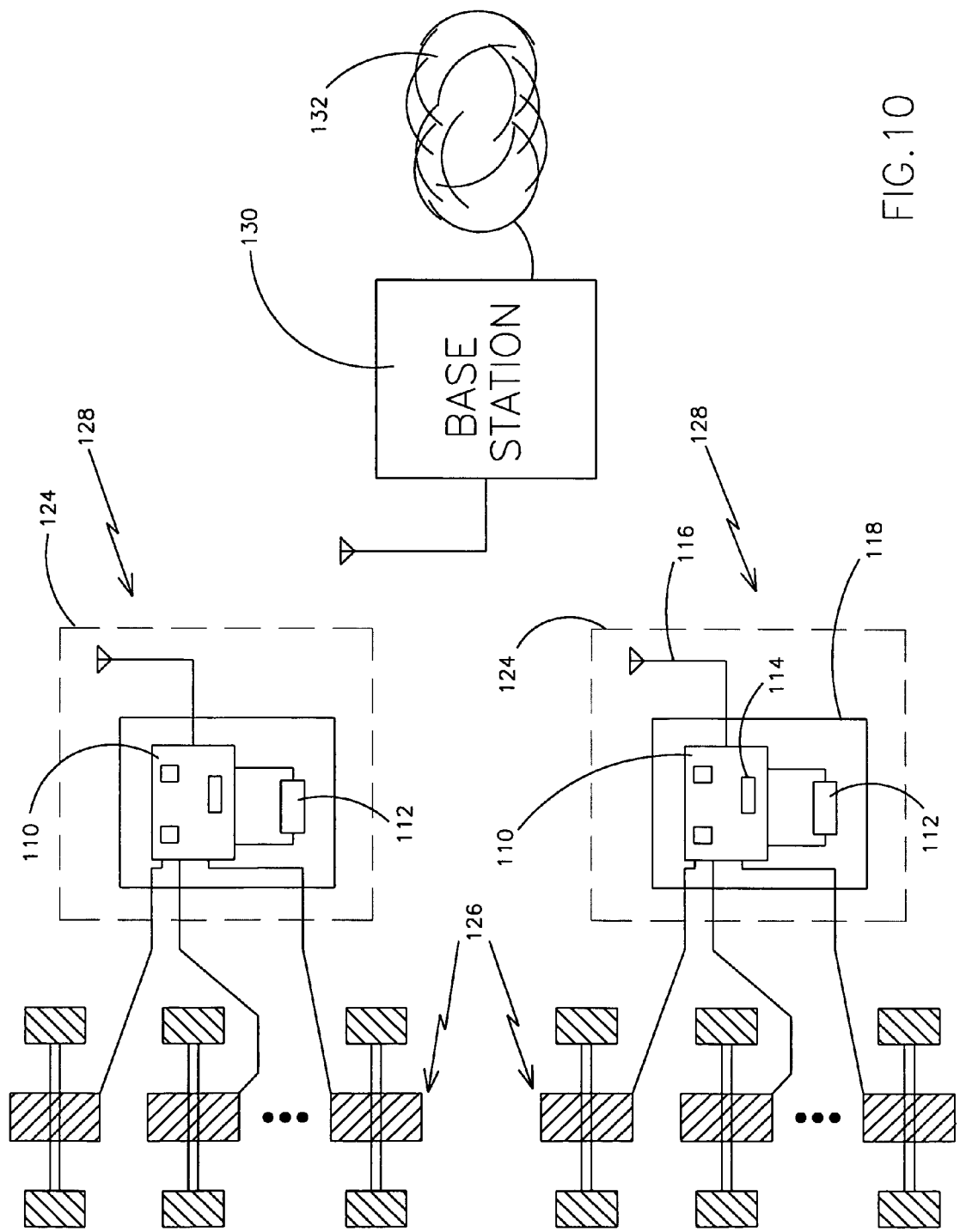

A number of vibrating wire sensors 126 can be wired to a single such housing 118 with its vibrating wire signal conditioner 124 including PC board 110, battery 112, transmitter or transceiver 114, and antenna 116, as shown in FIG. 9. Wireless network 130 of these multiple vibrating wire sensor systems 128 can be provided, as shown in FIG. 10, in which each vibrating wire signal conditioner 124 transmits data to base station 130 that may be connected to a PC or that may transmit data to remote locations over network 132, such as the internet. Base station 130 illustrated in FIG. 10 can be used to communicate with any of the embodiments of the vibrating wire gauge in this and other figures of this application.

Figure 11:
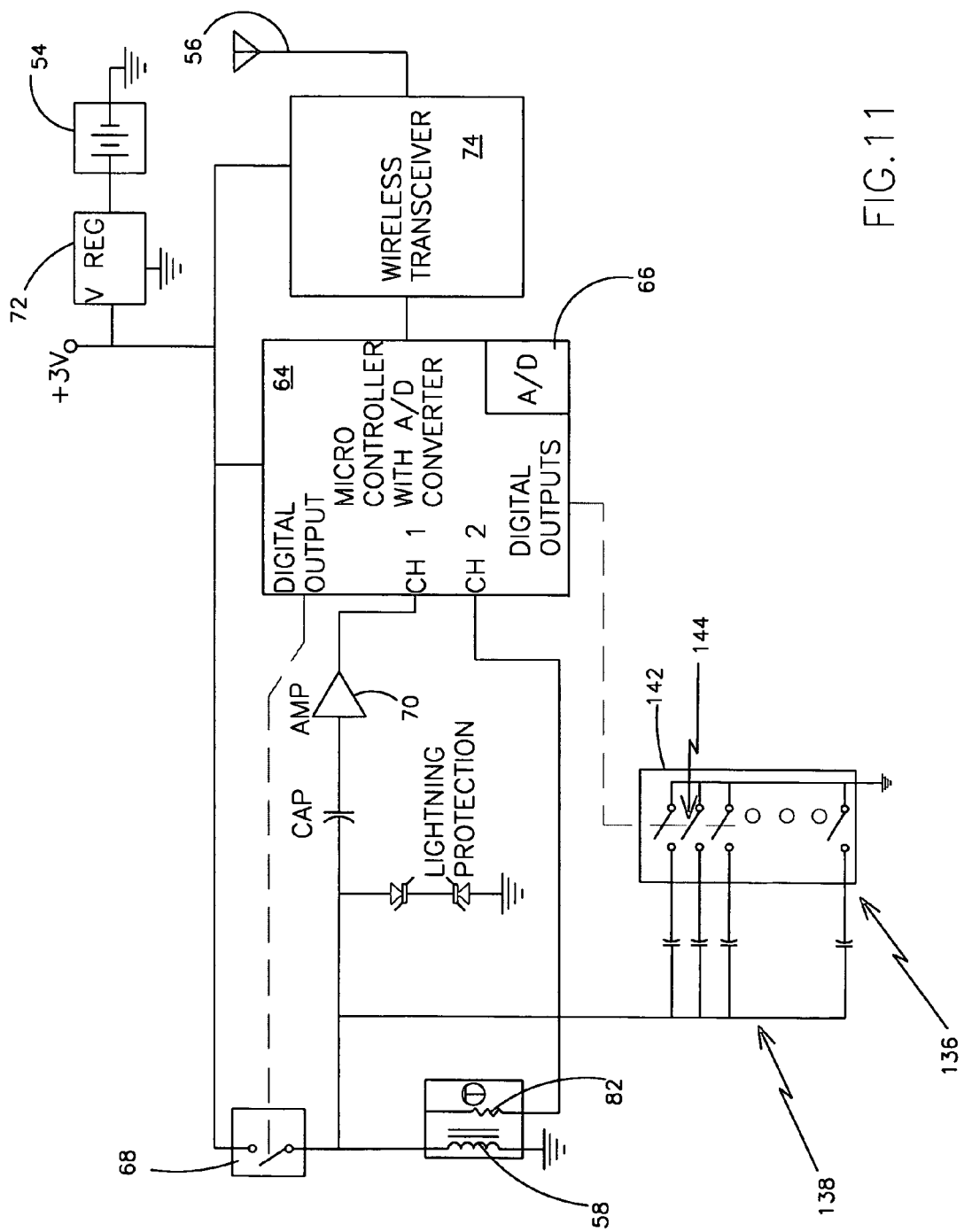
FIG. 11 is a block diagram of the components on the PC board and their connection to the coil, the battery and the antenna, as shown in FIG. 3 and with a variable reactance controlled by the microcontroller which can be dynamically tuned to provide the coil at resonance at the excitation frequency to save power.

Power consumption can be further reduced by dynamically tuning excitation coil 58 to resonance at the excitation frequency by providing variable capacitor 136 in parallel with coil 58, as shown in FIG. 11. At resonance, impedance is higher, less current is drawn through switch 68, and less power is consumed during each excitation pulse. As microcontroller 64 steps through different excitation frequencies, as described herein above, capacitance of variable capacitor 136 is adjusted by microcontroller 64 to maintain resonance. In addition to improving efficiency of using power to stimulate the wire into vibration, by providing a tank circuit that ultimately is tuned to the resonant frequency of wire 62, coil 58 is more sensitive to that frequency when used as a pickup coil. If two coils are used, one for excitation and one for pickup, both circuits can be tuned simultaneously under the control of microcontroller 64.

In the embodiment illustrated in FIG. 11 array 138 of fixed value capacitors 140 forms a tank circuit with coil 58. Multiplexor 142 is used to select which of capacitors 140 of array 138 are connected to the tank circuit. A digital signal from a digital output of microcontroller 64 controls which switch 144 or switches of multiplexor 142 are closed and therefore which capacitor 140 or capacitors are included in the tank circuit. Since microcontroller 64 has control of the frequency, the appropriate value of capacitance can be selected by microcontroller 64 to maintain resonance of the excitation coil. The relationship between coil inductance, resonance frequency and capacitance is $$f_{resonance} = (2\pi(LC)^{1/2})^{-1}$$

where $f_{resonance}$ is the desired electrical resonant frequency, L is the inductance of the coil, and C is the value of the variable capacitance that can be determined from this formula. Other ways of providing a variable capacitance besides a switched array of fixed value capacitors can also be used.

Figure 12:
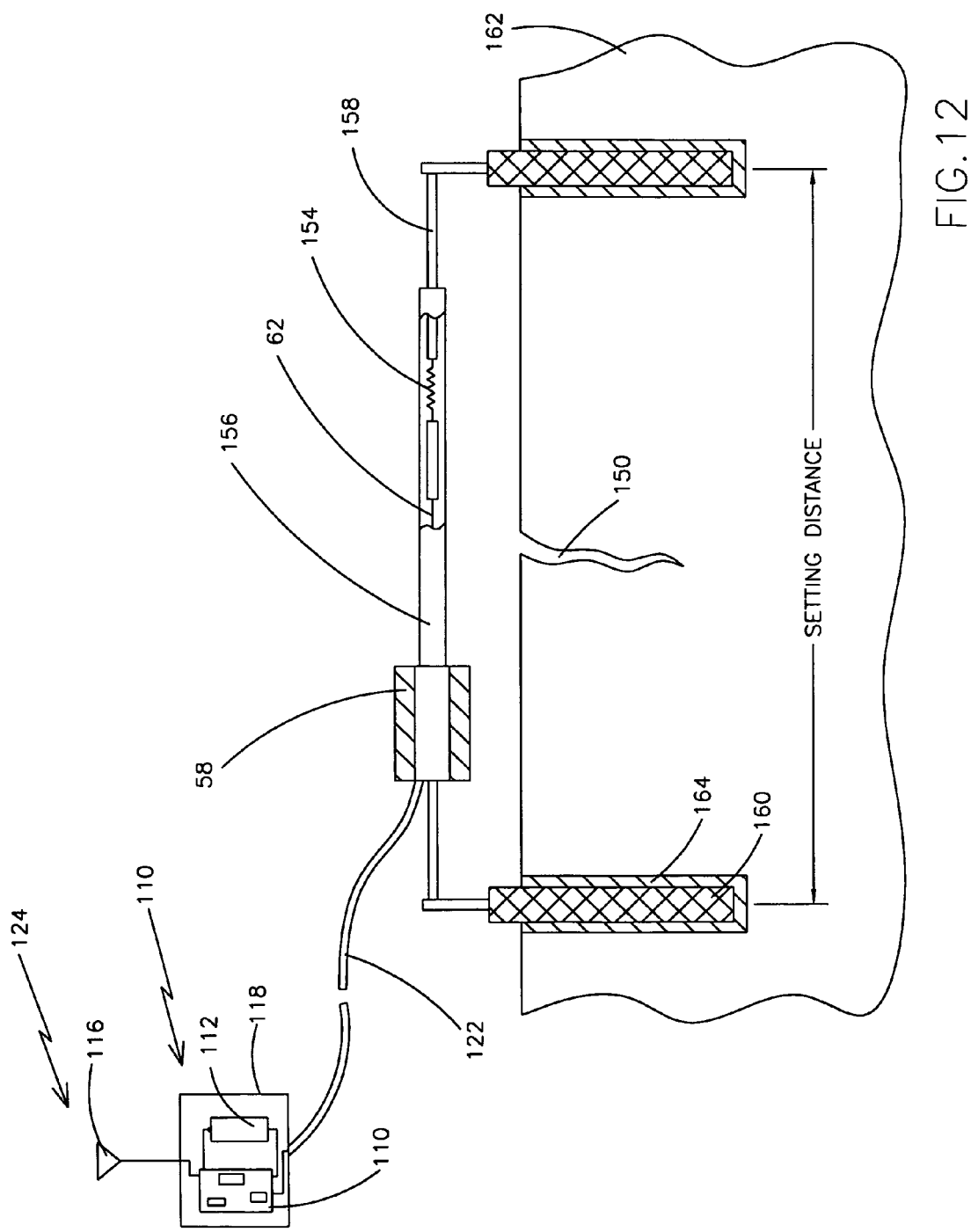
FIG. 12 is a cross sectional view of another embodiment of a vibrating wire strain gauge of the present application anchored to a structure and having a wired connection to a housing having the PC board, a battery, and an antenna for wirelessly transmitting to a reader.

The present invention is applicable to vibrating wire gauges used in a wide variety of applications, such as for detecting cracks 150 or the growth of cracks 150 in substrate 152, as shown in FIG. 12. In this case vibrating wire 62 may be anchored with helical extension spring 154 for measuring displacement, for example, as the crack widens. Helical extension spring 154 extends through stainless steel tube 156 and is connected to connecting rod 158 and groutable anchors 160 mounted to structure 162 with grout or epoxy 164. Although the embodiment with separate housing 118 for vibrating wire signal conditioning 124 is shown, this function could also be provided with the signal conditioning provided mounted in the same housing with coil 58 and vibrating wire 62, as shown in FIGS. 2a, 2b.

Figure 13:
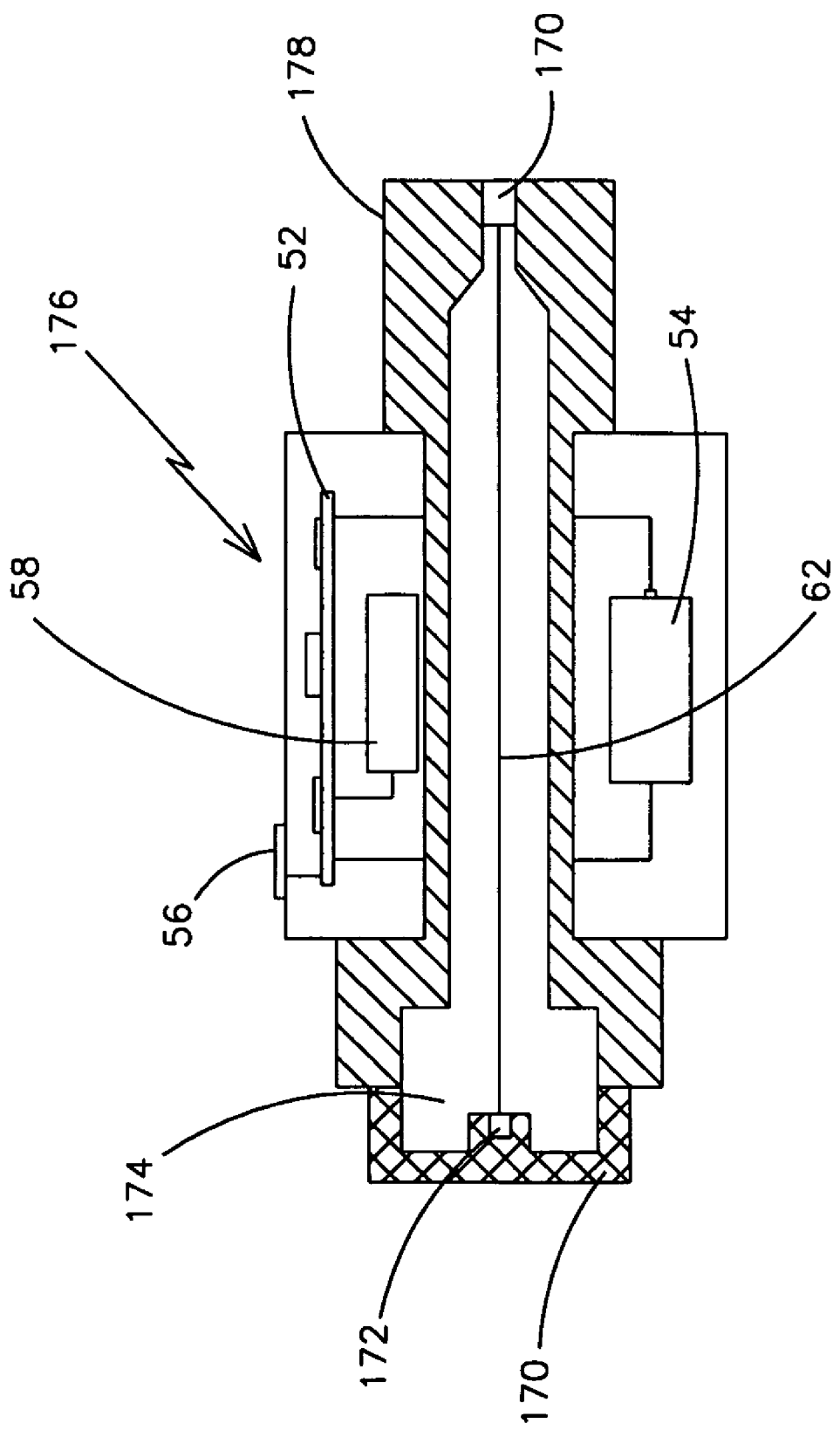
FIG. 13 is a cross sectional view of another embodiment of a vibrating wire strain gauge of the present application in a hermetically sealed and evacuated housing that also includes the coil, the PC board, a battery, and an antenna for wirelessly transmitting to a reader, in which one end of the wire is connected to a pressure sensitive diaphragm.

The present invention can also be used for measuring pressure, as shown in FIG. 13. In this case pressure sensitive diaphragm 170 is used. As outside pressure changes location of wire grip 172 holding vibrating wire 62 changes, and the amount of pressure change can be detected by measuring the vibration frequency of vibrating wire 62 connected to wire grip 172 within hermetically sealed and evacuated space 174. Although the embodiment with signal conditioning electronics and data logging transceiver 176 provided mounted in the same housing 178 with coil 58 and vibrating wire 62 is shown, this pressure measuring function could also be provided with a separate housing for the vibrating wire signal conditioning and data logging transceiver.

Figure 14:
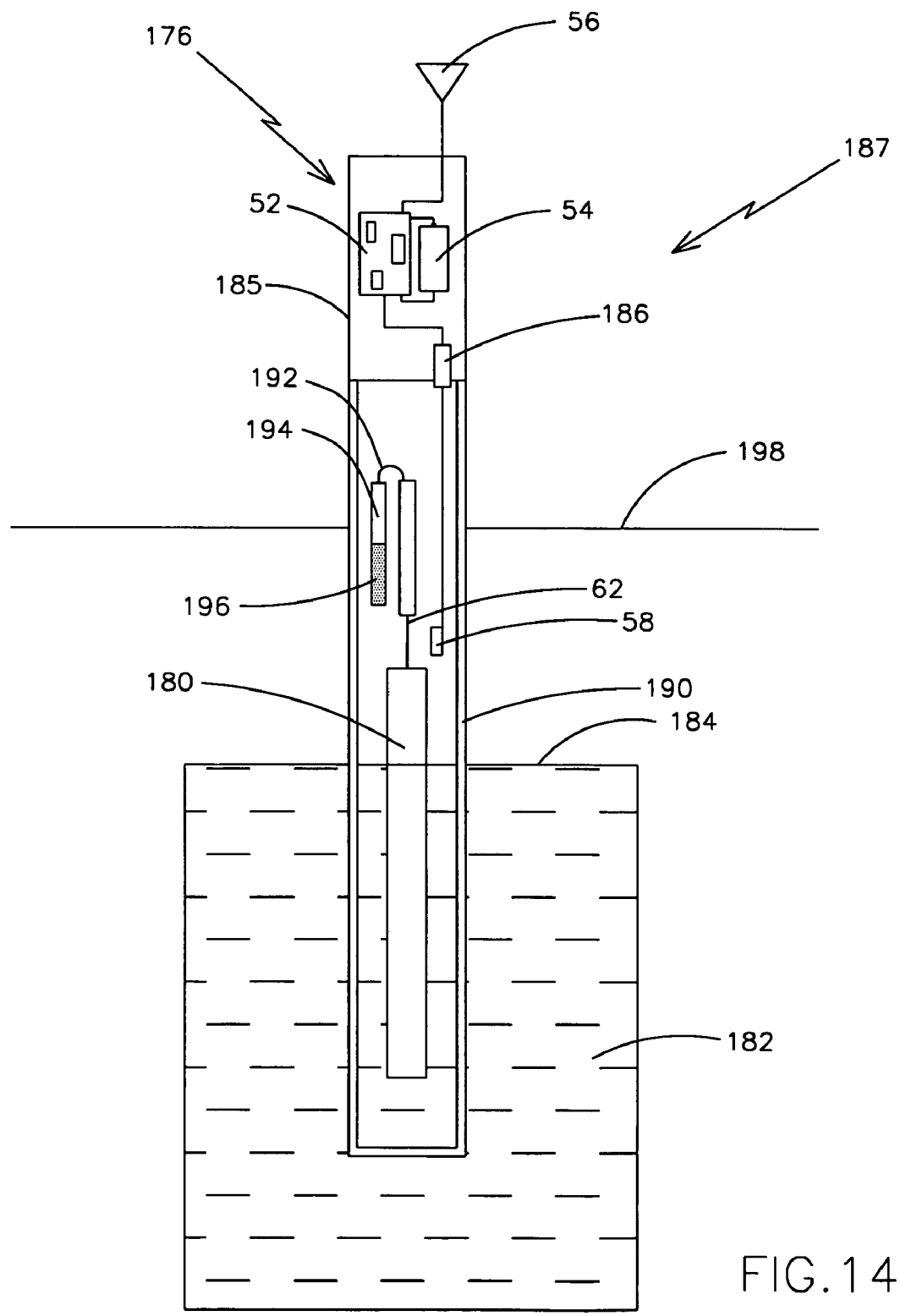
FIG. 14 is a cross sectional view of another embodiment of a vibrating wire strain gauge of the present application in a housing that also includes the coil, the PC board, a battery, and an antenna for wirelessly transmitting to a reader, in which one end of the wire is connected to weight or mass located in a slotted pipe and suspended in a container having a liquid, such as water, for determining the level of the liquid.

The present invention can also be used for measuring liquid level, as shown in FIG. 14. In this case weight or mass 180 is partially supported by a liquid, such as water 182, and as water level 184 changes the amount of support that is provided by water 182 changes. Thus, the tension in vibrating wire 62 changes with water level 184, and therefore the natural frequency of vibration of wire 62 varies with water level 184 so measuring that natural frequency provides a measure of water level 184. Although the embodiment with signal conditioning electronics and data logging transceiver 176 provided mounted with coil 58 and vibrating wire 62 is shown, this water level measuring function could also be provided with a separate housing for the vibrating wire signal conditioning. Signal conditioning electronics can be provided in a sealed portion of housing 185. Wiring connecting PC board 52 and coil 58 can extend through cable gland 186 to protect the electronics from moisture.

Water level measuring device 187 also includes vibrating wire support 188, slotted pipe 190 enclosing weight or mass 180, vent line 192, moisture trap 194, and desiccant 196. It can be used to measure the level of water with respect to a fixed level such as ground surface 198.

Figure 15:
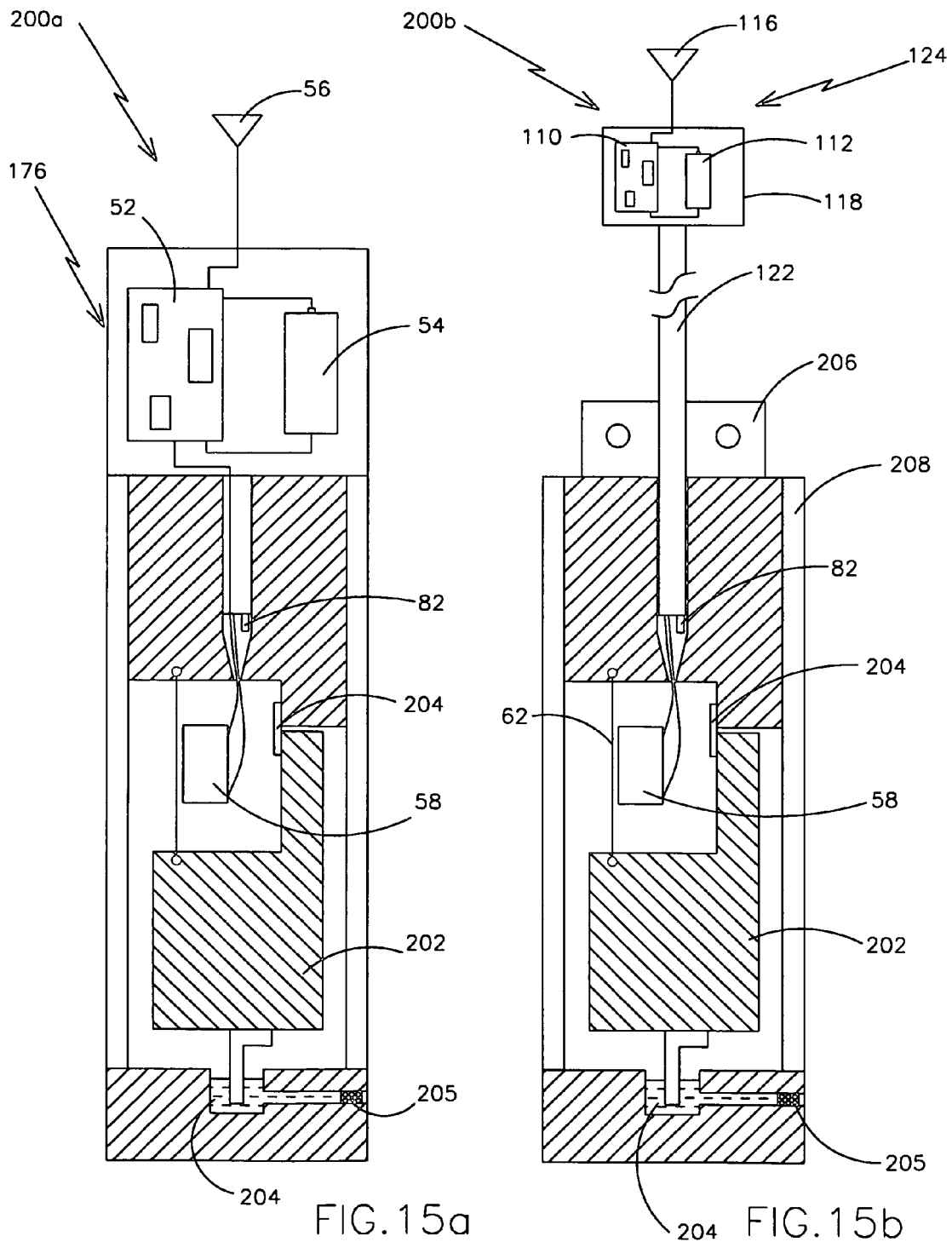
FIGS. 15a is a cross sectional view of another embodiment of a vibrating wire strain gauge of the present application used as an inclinometer in a housing that also includes the coil, the PC board, a battery, and an antenna for wirelessly transmitting to a reader, in which one end of the wire is connected to a weight or mass with tension varying with the angle of the weight or mass.
FIGS. 15b is a cross sectional view of another embodiment of a vibrating wire strain gauge similar to that of FIG. 15a except in this embodiment a cable connects signal conditioning electronics in a separate housing to the coil adjacent the vibrating wire.

The present invention can also be used as inclinometer 200a, 200b, as shown in FIGS. 15a, 15b. In this case weight 202 hanging off hinge 204 changes the tension of wire 62 according to the angle of suspension of weight 202. Thus, the inclination can be determined from the tension in wire 62. Damping slows the rate of change and increases resolution of the device so damping fluid 204 may optionally be used with seal screw 205. Signal conditioning electronics and data logging transceiver 176 is integrated with vibrating wire in a single housing in FIG. 15a. Cable 122 connects signal conditioning electronics 124 in its housing 118 through mounting flange 206 to coil 58 adjacent vibrating wire 62 in its housing 208 in FIG. 15b. In either case temperature sensor 82, such as a thermister, can be included near coil 58 and vibrating wire 62.

Figure 16:
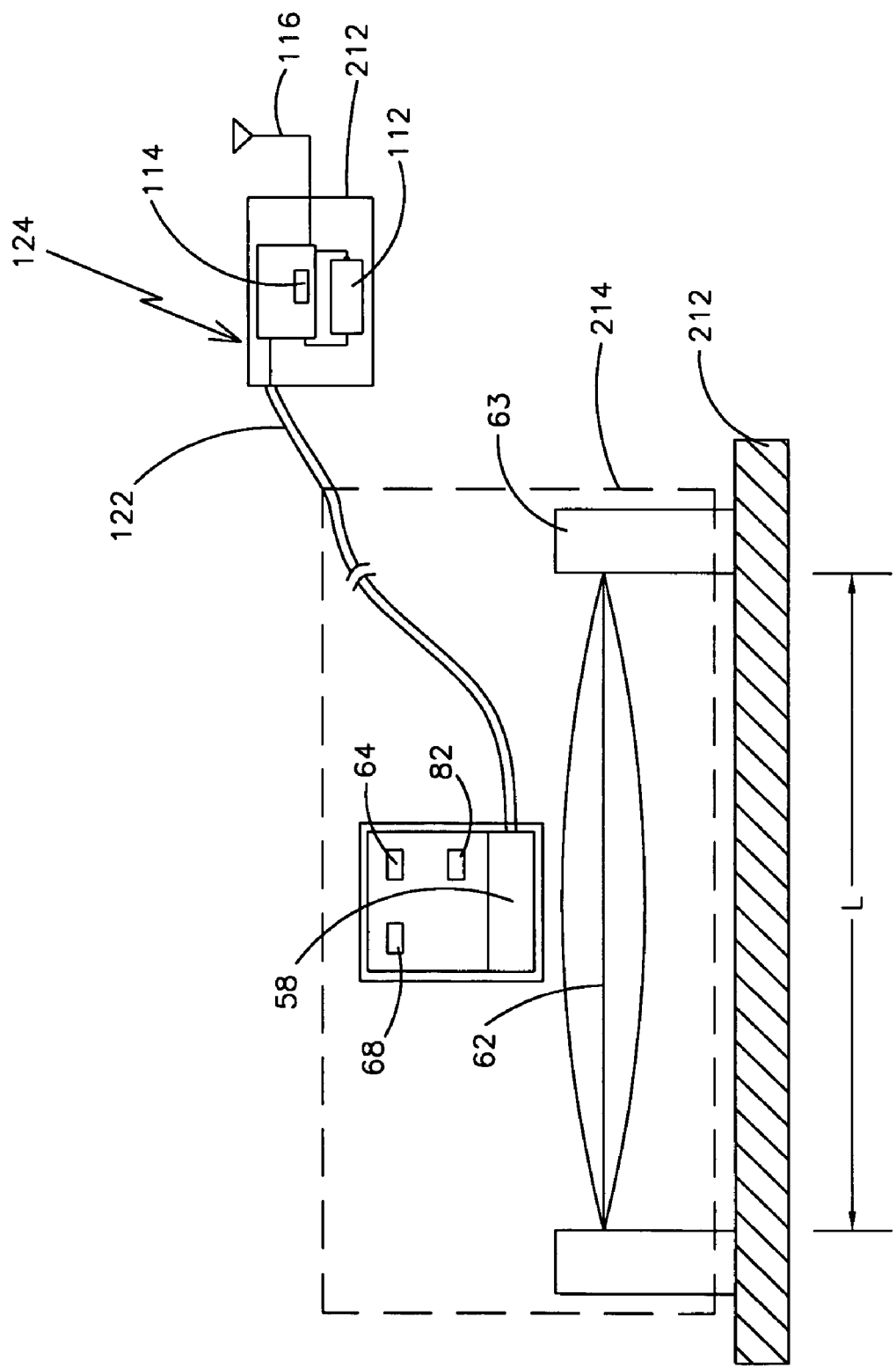
FIG. 16 is a cross sectional view of another embodiment of a vibrating wire strain gauge in which components are distributed between two housings connected by a cable in which a temperature sensor and a PC board with the microcontroller and switch are in the housing with the coil and the vibrating wire while a PC board with the transmitter, antenna, and battery are in the remote housing.

The distribution of components between housings in two-housing embodiments can be varied. In one embodiment microcontroller 64, temperature sensor 82, and switch 68 are provided in housing 210 with coil 58 and vibrating wire 62, mounted to structure 212 with anchors 63 as shown in FIG. 16. Remaining portions of electronics 124', including transmitter or transceiver 114, battery 112, and antenna 116 are provided in housing 214. This is particularly useful in embodiments in which vibrating wire sensor 126 is positioned in a location where wireless transmission is attenuated or blocked, such as for applications embedded in concrete or under water.

If portion of electronics 124' is connected to vibrating wire sensor 126' through cable 122, the present application still provides advantage from operating at lower power. In this embodiment housing 214 can includes vibrating wire 62, coil 58, microcontroller 64, switch 68 and temperature sensor 82. Battery 112 may be included either in housing 214 or in housing 212 with transmitter or transceiver 114 and antenna 116.

Energy harvesting can be used in the present application, as described in U.S. patent application 20040078662, "Energy Harvesting for Wireless Sensor Operation and Data Transmission," incorporated herein by reference. Also as described in "Power Management for Energy Harvesting Wireless Sensors," S. W. Arms et al, SPIE Int'l Symposium on Smart Structures & Smart Materials, Mar. 9, 2005, San Diego, Calif., incorporated herein by reference, and in "Strain Energy Harvesting for Wireless Sensor Networks, D. L. Churchill et al, SPIE Ann. Symp. on Smart Structures & Smart Materials, March 2003, San Diego, Calif., incorporated herein by reference.

Figure 17:
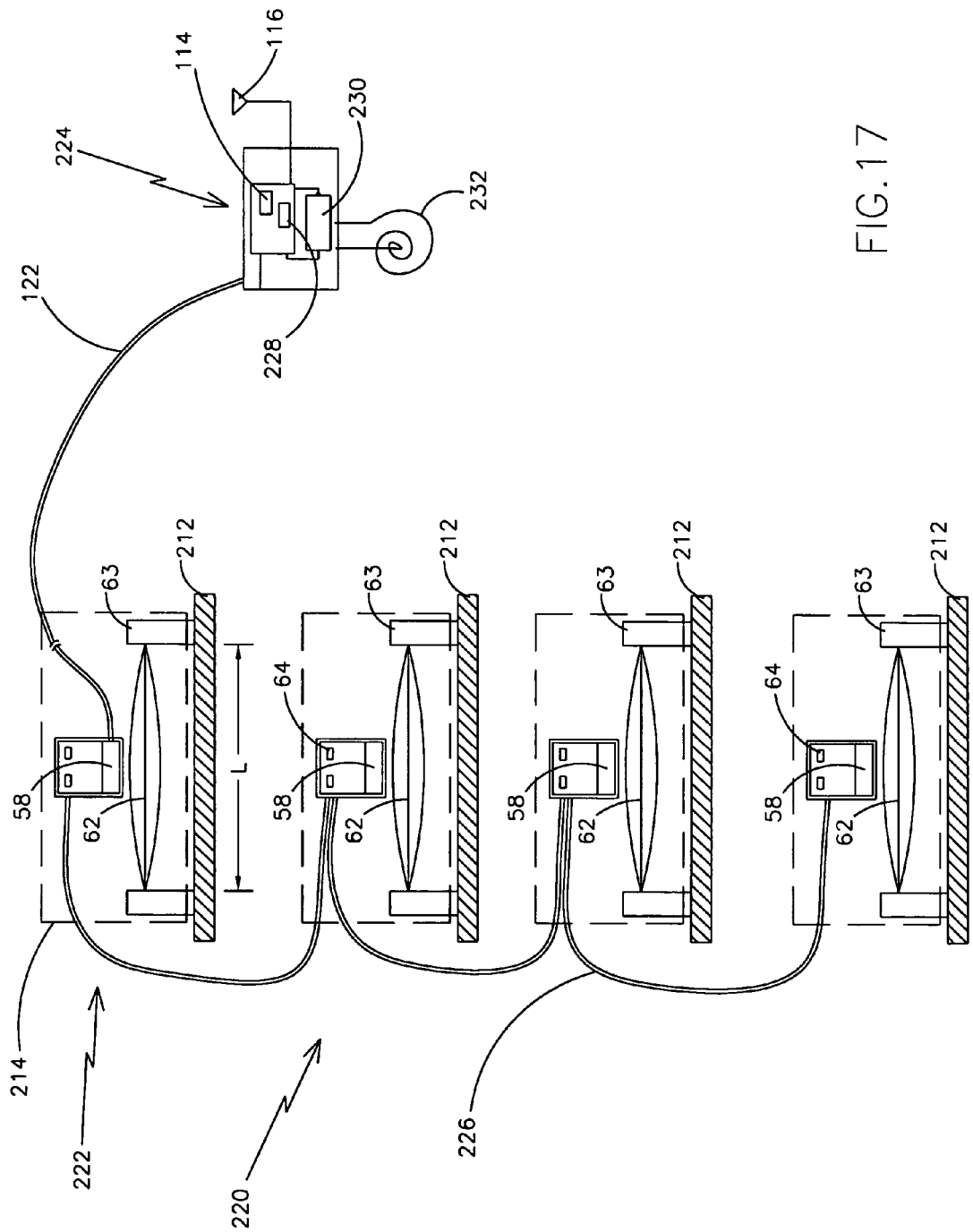
FIG. 17 is a cross sectional view of another embodiment of a vibrating wire strain gauge in which a network of vibrating wire sensors are connected to a PC board in another housing that includes a battery, a microcontroller, transceiver, and antenna, and in this embodiment the battery is inductively rechargeable.

A scheme to inductively recharge the battery can be used, as described in U.S. patent application 20030234730 ("the '730 application"), "Robotic System for Powering and interrogating Sensors," incorporated herein by reference, and as shown in FIG. 17 of this application.

A scheme for wireless sensor networks that can be used in the present application is described in "Wireless Sensor Networks," by Townsend and Arms, chapter 22 of the book, *Sensor Technology Handbook*, edited by John S. Wilson, Elsevier, Inc., 2005, incorporated herein by reference.

A scheme for reading data from and programing a network of sensors from a remote location that can use a cellular phone or satellite communication and the internet is described in a paper "Remotely Reprogrammable Sensors for Structural Health Monitoring," by Arms et al, Structural Materials Technology (SMT) NDE/NDT for Highways and Bridges, Sep. 16, 2004, Buffalo, N.Y., incorporated herein by reference.

A scheme for data logging is described in U.S. patent application 20020024450, "Data Collection and Storage Device," incorporated herein by reference.

Another wired scheme for connecting network 220 of vibrating wire sensors 126' to intermediate base station 224 is shown in FIG. 17. In this scheme vibrating wire sensors 126' are connected to each other through cables 226 and to intermediate base station 224 through cable 122 using an RS 485 network technique. Each vibrating wire sensor 126' includes microcontroller 64 and an address, switch 68, signal conditioning electronics, temperature sensor 82, along with coil 58 and wire 62. It can also include a battery or power can be supplied from intermediate base station 224. Power can be selectively distributed to one or more vibrating wire sensors 222 at a time using addressing from microcontroller 228 included in intermediate base station 224. Battery 230 can be a rechargeable type, and recharging can be accomplished inductively using coil 232, as further described in the '730 application.

Figure 18:
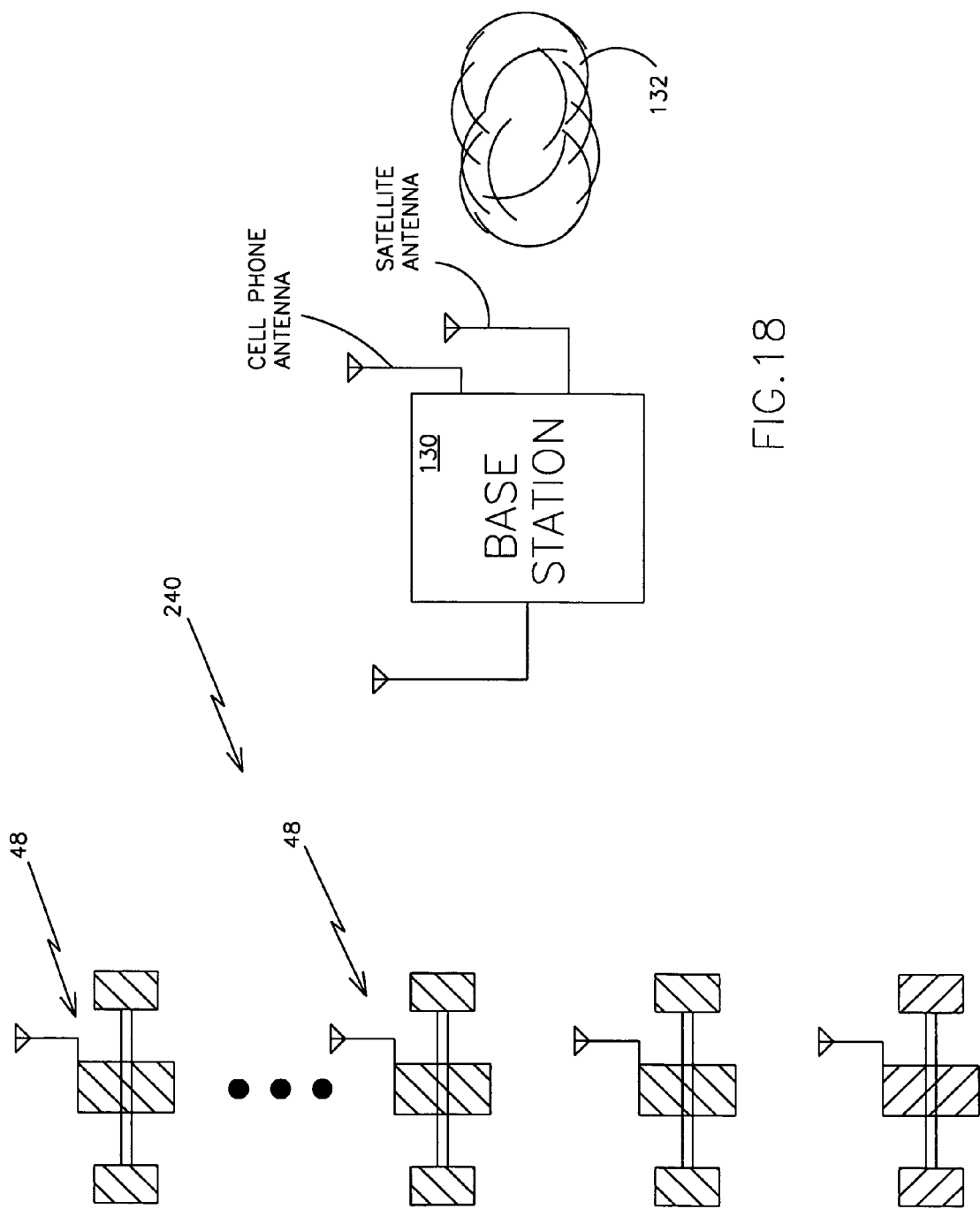
FIG. 18 is a cross sectional view of a wireless version of the network of vibrating wire strain gauges of FIG. 17 in which each addressable wire strain gauge includes a microcontroller, coil, temperature sensor, switch, power source or energy harvesting element, non volatile memory for data logging, a transceiver, and an antenna for wirelessly communicating with a base station, in which the base station may be connected to the internet.

One embodiment of a fully wireless version, shown in FIG. 18, has network 240 of vibrating wire systems 48, each with addressable signal conditioning electronics and data logging transceiver 176 mounted along with each vibrating wire 62 and coil 58. Base station 130 can query each vibrating wire system 48 individually through its address or it can command all vibrating wire systems 48 in network 240 to log data simultaneously using a broadcast command or it can command some or all sensor systems 48 in network 240 to go to sleep. Sensor systems 48 can be programmed to wake up periodically to listen for commands from base station 130, as described in U.S. patent application 20020024450, "Data Collection and Storage Device," incorporated herein by reference and in U.S. patent application 11/084541, having docket number 115-016, "Wireless Sensor System," incorporated herein by reference.

Base station 130 includes a single board computer that includes a microprocessor and other functions, such as a non-volatile memory, a power supply, and an 802.15.4 radio to communicate with sensor systems 48. Base station 130 also has a cellular phone module and/or a satellite radio and antennas for the phone and/or radios to communicate with a remote server that may be connected to network 132, such as the internet. Wired connection to the internet can also be used. Each vibrating wire sensor system 48 includes a microcontroller, coil, temperature sensor, switch, power supply or energy harvesting element, data logging, transceiver, and antenna, as shown in FIG. 2a, 2b and FIG. 3. The transceiver typically runs 802.15.4 protocols. An energy harvesting element can be used instead of a power supply in applications where ambient energy, such as vibration, rotation, or solar power, is available to power the system. For example if the gauges are located on a civil structure where ambient energy is available, power can be obtained to directly power the electronics and transmitter or to charge a capacitor or a rechargeable battery for powering the electronics and transmitter, as described in copending commonly assigned patent applications US 2004/0078662A1 to M. J. Hamel et al., "Energy Harvesting for Wireless Sensor Operation and Data Transmission," filed Mar. 5, 2003, incorporated herein by reference, and US 2005/0017602A1 to S. W. Arms et al., "Shaft Mounted Energy Harvesting System for Wireless Sensor Operation and Data Transmission," filed Jan. 30, 2004, incorporated herein by reference.

While the disclosed methods and systems have been shown and described in connection with illustrated embodiments, various changes may be made therein without departing from the spirit and scope of the invention as defined in the appended claims.

The invention claimed is:

1. A gauge, comprising a wire, a coil, and a source of excitation current pulses, wherein said wire is mounted to vibrate at natural frequency of said wire, wherein said coil is magnetically coupled to said wire, wherein said source of excitation current pulses includes a programmable processor and a memory, wherein said source of excitation current pulses is connected to provide a train of excitation current pulses to said coil, wherein each excitation current pulse of said train of excitation current pulses has an excitation time, wherein said train of excitation current pulses has a period and a time between excitation current pulses, wherein said excitation time is less than said time between excitation current pulses, wherein said memory includes a program to automatically vary said period of said train of pulses to reach a period that stimulates said wire to vibrate at said natural frequency.

2. A gauge as recited in claim 1, wherein said programmable processor includes an input connected to receive a signal from said coil.

3. A gauge as recited to claim 1, further comprising a second coil magnetically coupled to said wire, wherein said programmable processor is connected to receive a signal from said second coil.

4. A gauge as recited in claim 1, wherein said coil is part of a circuit, wherein said circuit includes a variable reactance for adjusting resonance of said circuit and for providing said circuit at resonance at any frequency within a range of frequencies to provide efficient electromagnetic radiation from said coil to said wire.

5. A gauge as recited in claim 1, wherein said circuit includes a variable capacitance.

6. A gauge as recited in claim 1, wherein said wire and said coil are mounted in a housing.

7. A gauge as recited in claim 6, wherein said source of excitation current pulses includes a programmable processor and a memory, wherein said programmable processor and said memory are mounted in said housing.

8. A gauge as recited in claim 7, further comprising a wireless transmitter and a power supply mounted in said housing, wherein power for operating said wireless transmitter is derived from said power supply, further wherein said wireless transmitter is connected to transmit data derived from said wire.

9. A gauge as recited in claim 7, further comprising a wireless transmitter and a power supply, said wireless transmitter mounted in said housing, wherein power for operating said wireless transmitter is derived from said power supply, wherein said power supply is external to said housing, further comprising a wired connection for providing power from said power supply to said coil, said processor, said memory and said wireless transmitter.

10. A gauge as recited in claim 1, further comprising a temperature sensor, wherein said temperature sensor is positioned to provide a temperature of said wire, wherein said temperature sensor is connected to said programmable processor.

11. A gauge as recited in claim 1, further comprising a power supply and a switch, wherein said switch is connected to said power supply and to said coil to provide an excitation current pulse of said train of excitation current pulses to said coil when said switch is closed, wherein said switch has a control terminal, wherein said programmable processor is connected to said control terminal, wherein timing of closing and opening said switch is controlled by a digital signal from said programmable processor.

12. A gauge as recited in claim 11, wherein said coil emits a train of magnetic pulses for stimulating said wire to vibrate, wherein said magnetic pulses have a magnetic pulse period equal to said period.

13. A gauge, as recited to claim 12, wherein said programmable processor is further connected to receive a signal between pulses of said train of pulses indicating that said wire is vibrating.

14. A gauge as recited in claim 1, wherein said programmable processor is further connected to receive a signal indicating that said wire is vibrating.

15. A gauge as recited in claim 14, wherein said connection for detecting when said wire is vibrating includes a signal conditioning circuit.

16. A gauge as recited in claim 15, wherein said signal conditioning circuit includes a capacitor and an amplifier.

17. A gauge as recited in claim 1, further comprising a wired connection for providing power and for communicating data.

18. A gauge as recited in claim 1, further comprising a wireless transmitter and a power supply.

19. A gauge as recited in claim 18, wherein said wireless transmitter is part of a wireless transceiver.

20. A gauge as recited in claim 19, wherein operation of said wireless transceiver is programmable.

21. A gauge as recited in claim 20, further comprising a first housing, an electronic switch, a temperature sensor, wherein said programmable processor, said power supply, said electronic switch, said temperature sensor, and said wireless transceiver are mounted within said first housing.

22. A gauge as recited in claim 20, further comprising a first housing, a second housing, a temperature sensor, wherein said coil and said temperature sensor are mounted in said first housing, wherein said programmable processor, said power supply, and said wireless transceiver are mounted in said second housing.

23. A gauge as recited in claim 20, further comprising a first housing, a second housing, a temperature sensor and a switch, wherein said coil, said programmable processor, said switch, and said temperature sensor are mounted in said first housing, wherein said wireless transceiver is mounted in said second housing.

24. A gauge as recited in claim 23, wherein said power supply is mounted in said second housing.

25. A gauge as recited in claim 18, further comprising a base station, wherein said wireless transmitter transmits to said base station.

26. A gauge as recited in claim 18, wherein said power supply includes a battery.

27. A gauge as recited in claim 18, wherein said power supply includes an energy harvesting circuit.

28. A gauge as recited in claim 1, further comprising a transient voltage suppressor circuit.

29. A gauge as recited in claim 1, further comprising a housing, a temperature sensor, and a switch, wherein said coil, said programmable processor, said switch, and said temperature sensor are mounted in said housing.

30. A gauge as recited in claim 29, further comprising a cable and a reader, said cable for hard wired connection to said reader.

31. A gauge as recited in claim 30, wherein said reader includes said power supply.

32. A gauge as recited in claim 1, wherein said programmable processor includes a program to receive a signal between each pulse of said train of pulses.

33. A gauge as recited in claim 1, comprising just one coil.

34. A gauge as recited in claim 1, wherein said memory includes a program to control provision of said excitation to said coil, wherein said program provides a train of pulses with a gradually changing period until a signal is received indicating that said wire is vibrating.

35. A gauge as recited in claim 34, wherein said train of pulses has an excitation time that is less than or equal to one quarter of said period.

36. A gauge as recited in claim 34, wherein said memory includes a program to correct said period for changes in temperature.

37. A gauge as recited in claim 1, wherein said wire is connected to at least one from the group consisting of a spring, a pressure sensitive diaphragm, and a weight.

38. A gauge as recited in claim 1, further comprising a plurality of nodes and a base station, wherein each node includes at least one said wire, coil, processor, and memory, wherein said plurality of nodes are in network communication with said base station.

39. A gauge as recited in claim 38, wherein said network communication with said base station is wireless.

40. A gauge as recited in claim 38, wherein said base station further includes a device for communicating to a remote server.

41. A gauge as recited in claim 38, wherein said base station further includes an energy harvesting element.

42. A gauge as recited in claim 1, further comprising a variable capacitance.

43. A gauge as recited in claim 42, wherein said variable capacitance includes a switched array of fixed value capacitors.

44. A gauge as recited in claim 42, wherein said variable capacitance is connected for dynamically tuning said coil to match frequency of said wire.

45. A gauge as recited in claim 1, wherein said memory includes a program for determining frequency of vibration of said wire from number of zero crossings in a measured time.

46. A gauge as recited in claim 1, wherein said programmable processor is capable of sleep mode and wherein said memory includes a program to enter said processor into sleep mode.

47. A gauge as recited in claim 1, wherein said wire is mounted to a structure for measuring changes in strain of the structure.

48. A method of making a measurement, comprising:
   a. providing a wire, a coil, and a source of excitation current pulses, wherein said wire is mounted to vibrate at natural frequency of said wire, wherein said coil is magnetically coupled to said wire, wherein said source of excitation current pulses includes a programmable processor and a memory, wherein said source of excitation current pulses is connected to provide a train of excitation current pulses to said coil;
   b. providing said train of excitation current pulses to said coil, wherein each excitation current pulse of said train of excitation current pulses has an excitation time, wherein said train of excitation current pulses has a period and a time between excitation current pulses, wherein said excitation time is less than said time between excitation current pulses, wherein said memory includes a program for running on said processor to automatically vary said period of said train of pulses to reach a period that stimulates said wire to vibrate at said natural frequency;
   c. using said processor to automatically vary said period to reach a period that stimulates said wire to vibrate at said natural frequency; and
   d. receiving a response signal derived from said vibration of said wire.

49. A method as recited in claim 48, further comprising determining that said wire is vibrating from presence of said response signal above a threshold.

50. A method as recited in claim 49, further comprising determining a parameter characteristic of frequency of vibration of said wire.

51. A method as recited in claim 49, further comprising storing and transmitting frequency of vibration of said wire when wire vibration is detected.

52. A method as recited in claim 51, further comprising measuring a temperature related to temperature of said wire, further comprising storing and transmitting said temperature.

53. A method as recited in claim 48, further comprising:
   a. providing a switch and a power supply, wherein said switch includes a control terminal, wherein said control terminal is connected to said programmable processor, wherein said switch is connected to said power supply and to said coil to provide current to said coil when said switch is closed; and
   b. providing a digital control signal from said programmable processor to said control terminal to repeatedly close and to open said switch to provide said train of excitation current pulses from said power supply to said coil, wherein said digital control signal has a first frequency, wherein said train of excitation current pulses has said first frequency, and wherein said coil emits a train of magnetic pulses at said first frequency for stimulating said wire to vibrate.

54. A method as recited to claim 48, wherein said response signal includes an analog signal, wherein said analog signal is received between excitation current pulses of said train of excitation current pulses.

55. A method as recited in claim 54, further comprising determining that said wire is vibrating from presence of said analog signal above a predetermined threshold.

56. A method as recited in claim 55, further comprising determining a parameter characteristic of frequency of vibration of said wire.

57. A method as recited in claim 48, further comprising providing at least one housing, wherein said wire, said coil, said programmable processor, and said memory are mounted in said at least one housing.

58. A method as recited in claim 57, wherein said wire, said coil, said programmable processor, and said memory are mounted in one housing.

59. A method as recited in claim 48, further comprising measuring a temperature related to temperature of said wire.

60. A method as recited in claim 59, further comprising providing a digital excitation signal from said programmable processor, wherein said digital excitation signal is in a frequency range based on a previous measurement as corrected for said measured temperature.

61. A method as recited in claim 48, further comprising providing a signal conditioning circuit for detecting when said wire is vibrating.

62. A method as recited in claim 61, wherein said signal conditioning circuit includes a capacitor and an amplifier.

63. A method as recited in claim 48, further comprising providing a wireless transmitter linked to receive and transmit data derived from vibration of said wire.

64. A method as recited in claim 63, wherein said wireless transmitter is part of a wireless transceiver.

65. A method as recited in claim 64, wherein power provided to said transceiver is under control of said programmable processor.

66. A method as recited in claim 48, further comprising providing a transient voltage suppressor circuit.

67. A method as recited in claim 48, further comprising measuring current in said coil at two times between said current pulses in said coil.

68. A method as recited in claim 67, wherein said two times are set to provide approximately a maximum difference if said wire is vibrating.

69. A method as recited in claim 68, further comprising repeatedly measuring current in said coil, further comprising averaging differences of said repeated two measurements.

70. A method as recited in claim 48, further comprising providing said programmable processor in sleep mode.

71. A method as recited in claim 48, further comprising performing a calculation in said programmable processor and transmitting a calculated result to provide at least one from the group including strain, pressure, inclination, temperature, displacement, and level.

72. A method as recited in claim 48, further comprising a base station, further comprising providing wirelessly transmitting data to said base station.

73. A method as recited in claim 48, comprising just one coil.

74. A method as recited in claim 48, further comprising providing a train of excitation current pulses with a gradually changing period.

75. A method as recited in claim 74, wherein said train of excitation current pulses has an excitation time that is less than or equal to one quarter of said period.

76. A method as recited in claim 48, further comprising correcting period for changes in temperature.

77. A method as recited in claim 48, further comprising connecting said wire to at least one from the group consisting of a spring, a pressure sensitive diaphragm, and a weight.

78. A method as recited in claim 48, further comprising providing a plurality of nodes and a base station, wherein each node includes at least one said wire coil, processor, and memory, and further comprising providing said plurality of nodes in network communication with said base station.

79. A method as recited in claim 78, wherein said network communication with said base station is wireless and wirelessly communicating with said base station.

80. A method as recited in claim 78, wherein said base station further includes a device for communicating to a remote server and communicating with said remote server.

81. A method as recited in claim 78, wherein said base station further includes an energy harvesting element and providing energy from said energy harvesting element to each of said plurality of nodes.

82. A method as recited in claim 48, further comprising a power supply.

83. A method as recited in claim 82, wherein said power supply includes a battery.

84. A method as recited in claim 82, wherein said power supply includes an energy harvesting circuit.

85. A method as recited in claim 48, further comprising determining frequency of vibration of said wire while said wire is vibrating.

86. A method as recited in claim 48, further comprising attaching said wire to a structure for measuring changes in strain of the structure.

87. A gauge comprising a wire, a coil, a programmable processor, a memory, a wireless transmitter, and an energy harvesting circuit, wherein said wire is mounted to vibrate at natural frequency of said wire, wherein said coil is magnetically coupled to said wire, wherein said programmable processor provides a digital signal, wherein said programmable processor is connected to provide a train of excitation current pulses to said coil, wherein said train of excitation current pulses is derived from said digital signal, wherein each excitation current pulse of said train of excitation current pulses has an excitation time, wherein said train of excitation current pulses has a period and a time between excitation current pulses, wherein said excitation time is less than said time between excitation current pulses, wherein said memory includes a program to automatically vary said period of said train of pulses to reach a period that stimulates said wire to vibrate at said natural frequency, wherein said coil, said programmable processor, said memory and said wireless transmitter receive all power for their operation derived from said energy harvesting circuit.

\* \* \* \* \*